United States Patent [19]

Seki et al.

[11] Patent Number: 4,492,966

[45] Date of Patent: Jan. 8, 1985

[54] RECORDING APPARATUS

[75] Inventors: Mitsuaki Seki, Machida; Shigemitsu Tazaki, Matsudo; Yoshiaki Shirato, Yokohama, all of Japan

[73] Assignee: Canon Kabushiki Kaisha, Tokyo, Japan

[21] Appl. No.: 589,870

[22] Filed: Mar. 16, 1984

Related U.S. Application Data

[63] Continuation of Ser. No. 407,090, Aug. 11, 1982, abandoned, which is a continuation of Ser. No. 135,192, Mar. 28, 1980, abandoned.

[30] Foreign Application Priority Data

Apr. 2, 1979 [JP] Japan .......... 54-39475

[51] Int. Cl.[3] .......... G01D 5/26; G01D 15/16

[52] U.S. Cl. .......... 346/33 A; 346/140 R; 358/293; 358/296

[58] Field of Search .......... 358/296, 302, 293, 286; 346/33 A, 75, 108, 140 R

[56] References Cited

U.S. PATENT DOCUMENTS

| | | | |
|---|---|---|---|
| 2,556,550 | 6/1951 | Murray | 346/140 X |
| 3,090,828 | 5/1963 | Bain | 346/33 A X |
| 3,394,385 | 7/1968 | Lloyd | 346/49 |
| 3,553,708 | 1/1971 | Carreira | 346/140 X |
| 3,621,138 | 11/1971 | McNaney | 346/108 X |
| 3,693,179 | 9/1972 | Skala | 346/140 X |
| 3,798,365 | 3/1974 | Browning | 346/76 L X |
| 3,878,519 | 4/1975 | Eaton | 346/140 X |
| 3,925,787 | 12/1975 | Suzuki | 346/75 |
| 4,012,676 | 3/1977 | Giebler | 318/135 |
| 4,030,122 | 6/1977 | Chemelli | 346/76 L X |
| 4,243,994 | 1/1981 | Kobayashi | 346/140 R |
| 4,251,824 | 2/1981 | Hara | 346/140 R |
| 4,266,251 | 5/1981 | Hara | 358/286 |

OTHER PUBLICATIONS

Camphausen D. L.; Photoactivated INK Spray; Xerox Disclosure Journal; vol. 1, No. 4, Apr. 1976, p. 75.

*Primary Examiner*—Joseph W. Hartary

*Attorney, Agent, or Firm*—Fitzpatrick, Cella, Harper & Scinto

[57] ABSTRACT

A recording apparatus includes a recording unit having a plurality of dot forming portions disposed in a plane, a carriage which moves incrementally in a direction normal to the plane of dot forming portions, and a laser generator mounted on the carriage. The generator has a semiconductor which radiates a laser pulse in a direction substantially perpendicular to each dot forming portion of the recording unit.

13 Claims, 39 Drawing Figures

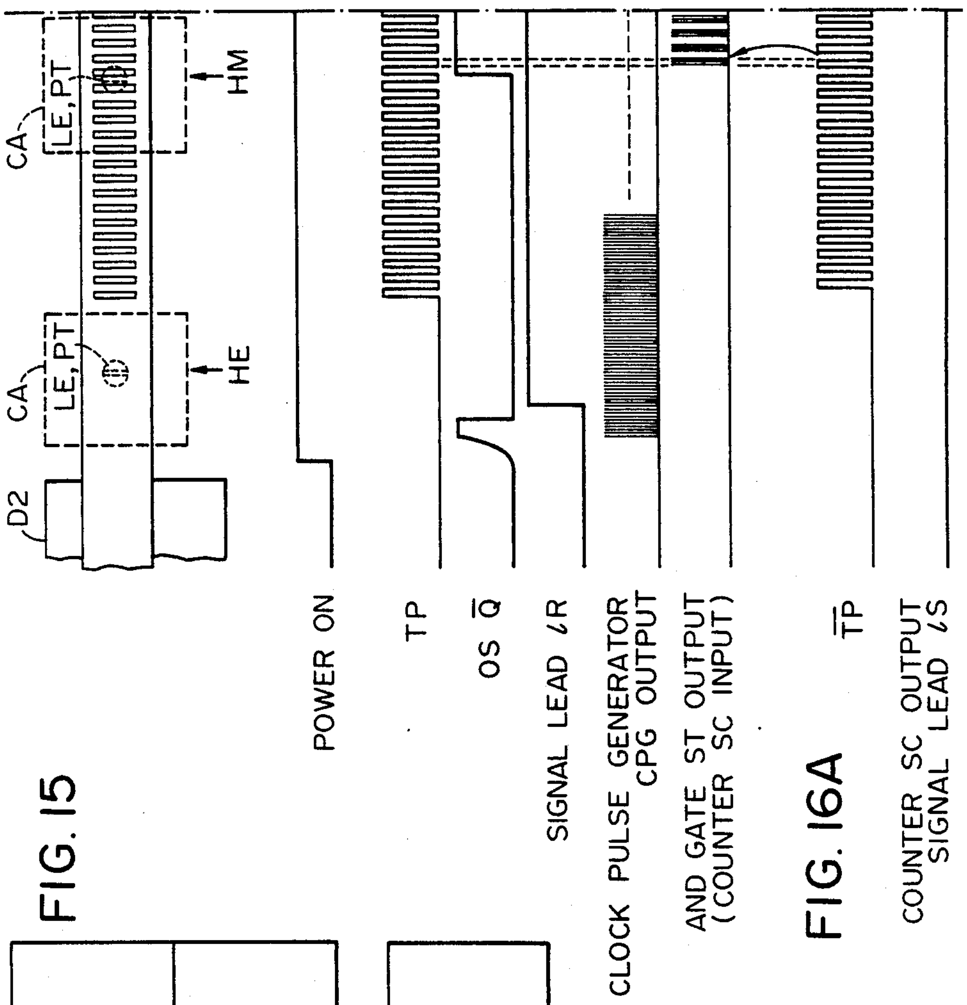
FIG. 16A
FIG. 15
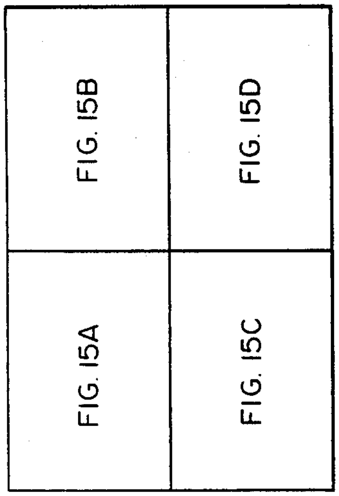
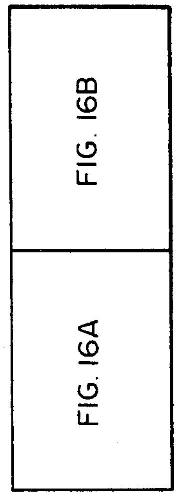
FIG. 16

RECORDING APPARATUS

This application is a continuation of application Ser. No. 407,090, filed Aug. 11, 1982, now abandoned, which is a continuation of Ser. No. 135,192, filed Mar. 28, 1980, now abandoned.

BACKGROUND OF THE INVENTION

1. Field of the Invention

The present invention relates to a recording apparatus having a novel mechanism, and more particularly to a recording apparatus capable of resolving technical difficulties that have been unavoidable in the prior art.

2. Description of the Prior Art

Conventional recording apparatus have been inevitably associated with certain limitations in compactization, high-density recording, recording quality, ease of maintenance, stability in operation, etc. For example the recording apparatus disclosed in the U.S. Pat. No. 3,878,519 has to be bulky because of the presence of pressurizing means, deflecting means, etc.

SUMMARY OF THE INVENTION

The object of the present invention is to provide a recording apparatus which can be realized in an extremely small size, be operated at a high speed and easily achieve a high-density recording.

Recording apparatus, comprising: a recording unit having a plurality of dot forming portions disposed in a plane, a carriage movable incrementally in a direction normal to the plane of dot forming portions, and laser generating means mounted on the carriage and having a semiconductor which radiates a laser pulse in a direction substantially perpendicular to each dot forming portion of the recording unit.

BRIEF DESCRIPTION OF THE DRAWINGS

FIGS. 16A and 16B, when combined as shown in FIG. 16 are a waveform chart showing the function of initial position setting;

FIGS. 17A, and 17B-1 and 17B-2, when combined as shown in FIG. 17B, are waveform charts showing the printing operation;

DESCRIPTION OF THE PREFERRED EMBODIMENTS

The present invention will now be explained in detail by the following description to be taken in conjunction with the attached drawings.

Figure 1:
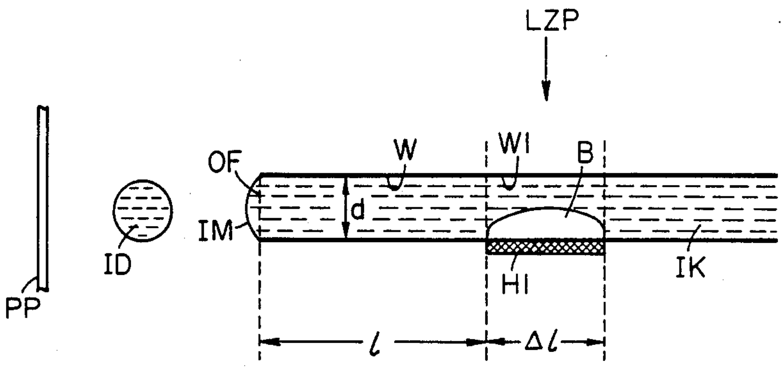
FIGS. 1, 2 and 3 are schematic views showing the working principle of the recording head.

Referring to FIG. 1 showing the working principle of the recording head of the present invention, a liquid chamber W constituting the recording head is supplied with a recording liquid IK by capillary action. When a laser signal LZP is given to a photothermal transducing member H1 in a portion of a width Δl in a liquid chamber portion W1 distanced by l from an orifice OF to heat the member to a temperature higher than the evaporating point of the recording liquid in said liquid chamber portion W1, on transducing member H1 there is generated a bubble B which rapidly increases the volume thereof with further temperature rise. As the result the pressure in liquid chamber W1 increases rapidly, and the recording liquid present in the liquid chamber W1 is rapidly displaced toward the orifice OF and toward the opposite direction corresponding to the volume increase by the generation of said bubble B. Consequently a part of the recording liquid present in the liquid chamber W of the length l is emitted from the orifice OF. The emitted liquid forms a liquid column which subsequently terminates the development thereof but of which front end portion accumulates the kinetic energy furnished thereto by then. Also in case the bubble collides with the ceiling of the liquid chamber W1, the force of collision is diverted in the longitudinal direction to further enhance the liquid expelling force.

Upon termination of the laser signal LZP given to the transducer H1, the temperature thereof initiates gradual lowering, whereby the bubble B initiates to contract with a slight delay from the termination of said laser signal LZP. Along with said volumic contraction of the bubble B the liquid is supplied to the portion of Δl from the direction of orifice OF and also from the opposite liquid replenishing direction. As the result a portion of the liquid column close to the orifice OF is again retracted into the chamber W1, so that, because of oppositely directed kinetic energy between the front end portion of the liquid column and the remaining portion thereof close to the orifice OF, the front end portion becomes separated as a minute liquid droplet ID which flies toward a member PP and is deposited on a determined position thereof. The bubble B on the transducer H1 is gradually annihilated by heat dissipation. The gradual disappearance of the bubble B causes gradual retraction of the liquid meniscus IM. In this manner the meniscus is maintained in a stable surface state during the retraction and it is therefore rendered possible to avoid failure of succeeding droplet emission resulting from excessive meniscus retraction caused by air introduction from destructed meniscus. The position of the bubble generation should be selected suitably as a bubble generation too close to the orifice OF will result in the emission of said bubble itself from the orifice, thus eventually leading to the destruction of the liquid droplet ID while a bubble generated too far from the orifice will be unable to cause droplet emission. The aforementioned gradual contraction of the bubble B is based on heat dissipation, vapor condensation to liquid, liquid supply by capiliary action, etc.

The size of the liquid droplet ID emitted from the orifice OF is dependent on the parameters of the apparatus such as the quantity of thermal energy applied, width Δl of the liquid chamber portion subjected to said thermal energy, internal diameter d of the liquid chamber W, distance l from the orifice OF to the position receiving the laser signal LZP, etc., and physical properties of the liquid IK such as specific heat, thermal conductivity, thermal expansion coefficient, viscosity, surface tension, etc.

Figure 2:
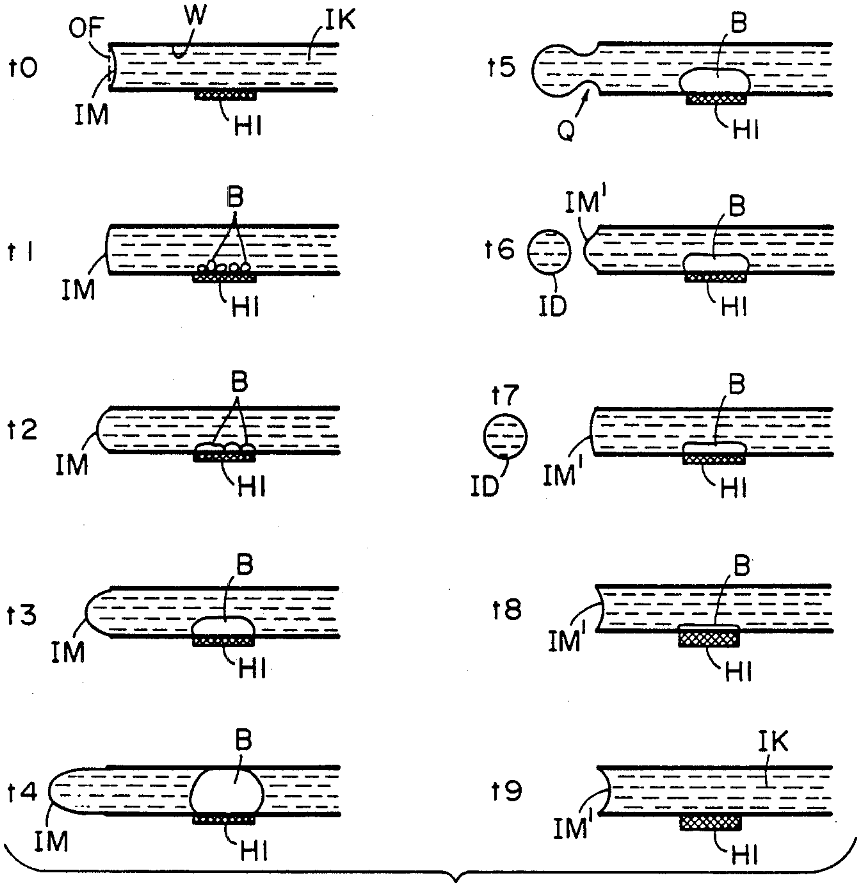
Figure 3:
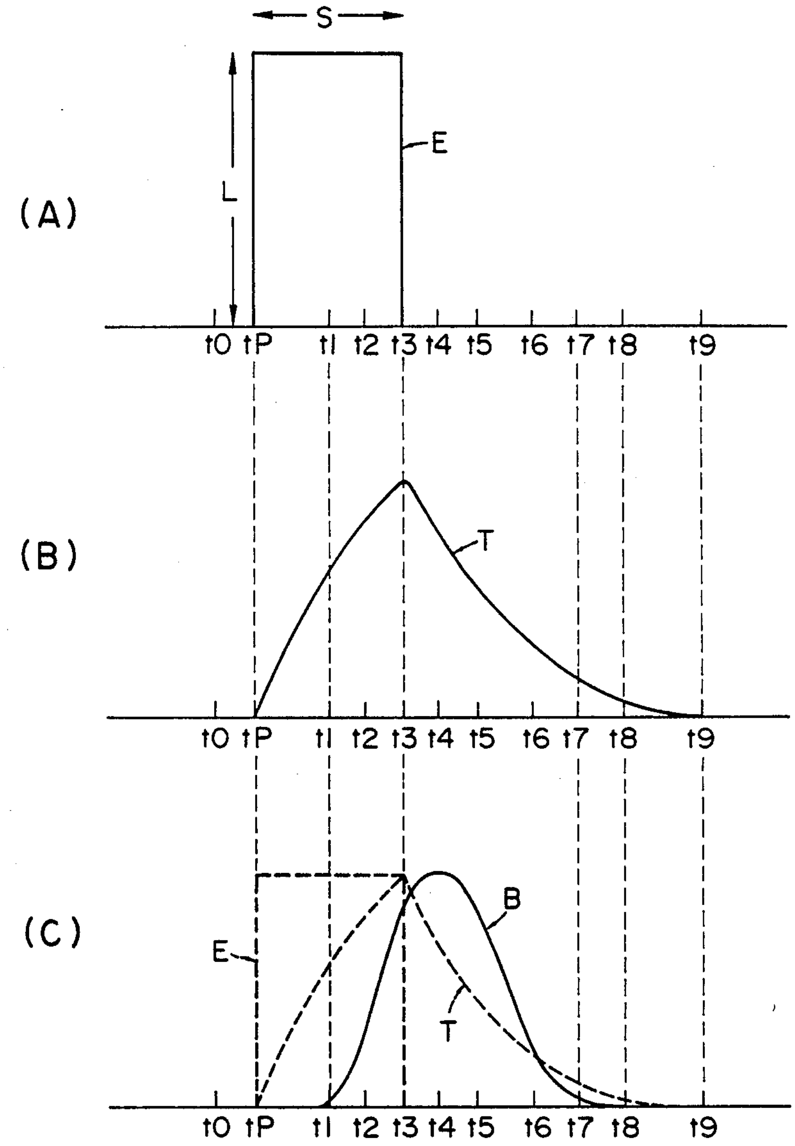

FIG. 2 shows the procedure of the recording liquid (ink) emission in stages t0–t9, wherein the ink chamber W equipped with an orifice OF and a transducer H1 is supplied with ink IK by capillary action. The boundary liquid surface between the ink IK and air is represented by IM, and the bubble generated on the transducer H1 is shown by B. FIGS. 3A, 3B and 3C respectively show an example of a laser or drive signal E, corresponding temperature change T and volumic change of the bubble B, wherein t0–t9 indicate times corresponding to those shown in FIG. 2. The stage t0 shows the state prior to the start of emission procedure, and a drive signal E is given to the laser head at a time tp between t0 and t1. The temperature starts to rise simultaneously with the start of the drive signal E and exceeds the evaporating point of the ink at the stage t1 in which the bubble generation is initiated and the liquid meniscus IM becomes expanded from the orifice OF correspondingly. In the stage t2 the meniscus IM becomes further expanded along with the growth of the bubble B. At the stage t3 the drive signal E is terminated and the temperature reaches maximum, whereby the meniscus IM shows further expansion. At t4 the temperature already becomes lower as shown in FIG. 3B but the bubble B reaches the maximum volume as shown in FIG. 3C whereby the growth of the meniscus is still continued. At t5 the bubble B starts to contract and the ink IK is correspondingly retracted into the ink chamber W through the orifice OF to generate a constricted portion Q in the liquid meniscus IM. The bubble contraction further proceeds in the stage t6 whereby a liquid droplet ID becomes separated from the liquid meniscus IM'. At t7 the separated droplet ID continues the flight while the meniscus IM' approaches to the orifice OF due to continued contraction of the bubble B. At t8 the bubble B is almost annihilated, and the meniscus IM' is retracted inside the orifice OF. At t9 the original state is recovered by ink replenishment through capillary action.

As will be apparent from the foregoing explanation the form of the drive signal is an important factor for stable emission of the ink IK, while the bubble contraction is an important factor for determining the separation of the ink droplet, the contraction being easily controllable by the form of the drive signal. It is also possible to control the droplet emission speed and the emission frequency by the form of said drive signal.

Figure 4:
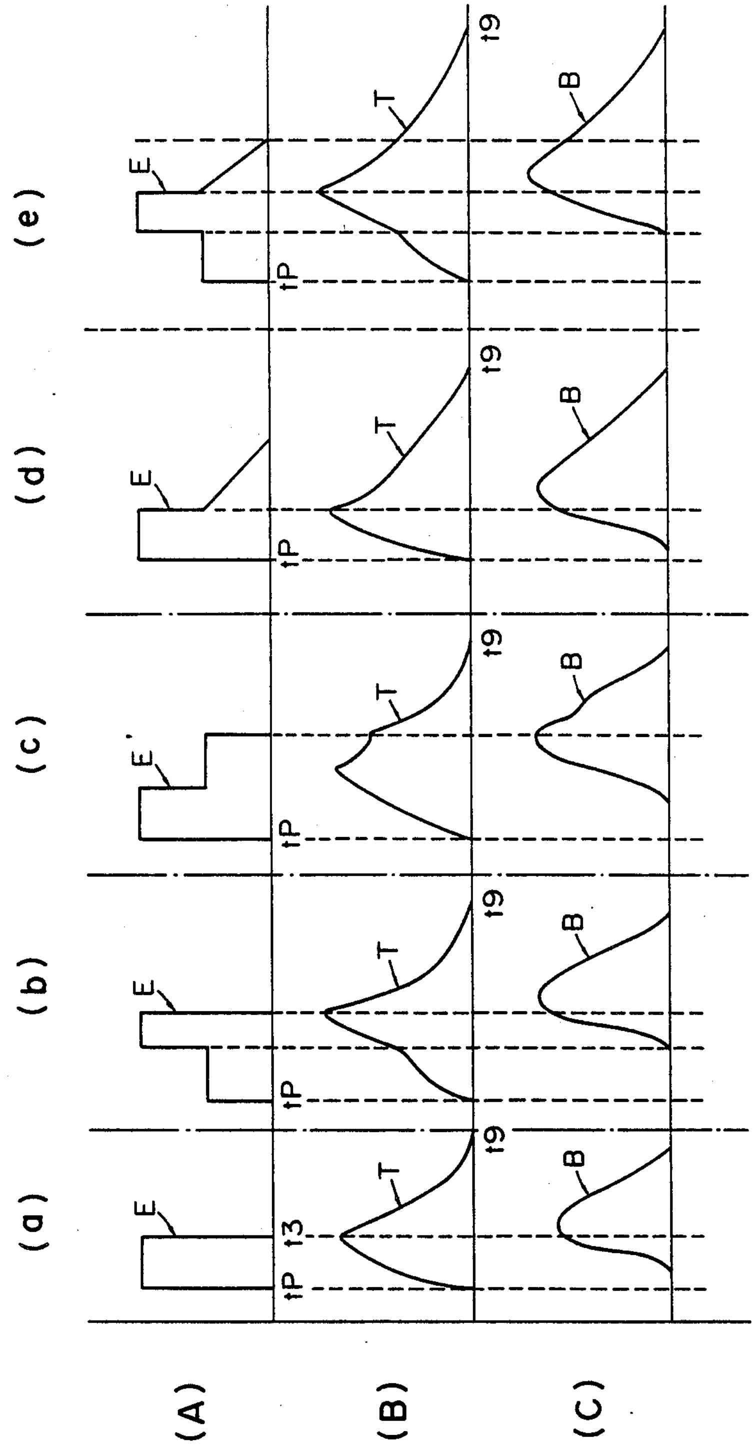
FIG. 4 is a waveform chart showing various drive signals.

In FIGS. 4A, 4B and 4C there are respectively shown various drive signals E; corresponding temperature change T in the transducer H1, recording liquid or bubble; and corresponding volumic change of the bubble B.

It is found that any of these signals is capable of causing satisfactory ink droplet emission. The waveform (a) is particularly effective in that the drive circuit does not require particular specifications such as the high resistor in the CR discharge circuit in the piezo-electric drive system. This waveform allows to prevent excessive retraction of the meniscus without using said high resistor as the temperature fall takes at least two times of the temperature rise as shown in FIG. 3B. The waveform (b) performs preheating before the main pulse to reduce the width of the main pulse for droplet emission. This waveform achieves rapid bubble generation and is effective also for improving emission and response frequency. Also this waveform allows to prevent inconvenience resulting from excessive heating of the recording liquid as the preheating is conducted only at the recording. The waveform (c) conducts post-heating at the trailing end of the main pulse for achieving further gradual retraction of the meniscus. This waveform avoids air introduction into the liquid chamber after the droplet emission and assures smooth droplet emission at the subsequent recording operation. Also in this case the generated bubble is completely annihilated each time to ensure subsequent recording operation as the post-heating is conducted only at the recording. The waveform (d) performs gradual heat dissipation for achieving smooth droplet separation and preventing excessive meniscus retraction thereafter without sacrificing the speed of the emitted droplets. The waveform (e) is also an effective drive signal obtained by combining the waveforms (b) and (d).

Also the present invention is not limited to the aforementioned laser beam but also includes the use of other electromagnetic wave sources such as those emitting visible light, infrared light, ultraviolet light, X-ray, other radiations and electric waves. As an example the generation and annihilation of bubble can be similarly achieved by irradiating nitrogen dioxide $NO_2$ mixed in the ink IK with ultraviolet light.

In either of the foregoing the droplet emission can be achieved simply by the control of the drive signal without the use of external high resistor or the like, and a very gradual bubble contraction is obtained through heat dissipation, vapor condensation to liquid and liquid supply by capillary action to satisfactorily prevent failure of droplet emission upon entry of the succeeding print instruction pulse caused by air introduction through the orifice resulting from rapid retraction of the liquid-meniscus. The preferred generation and contraction of the bubble is determined by the width S and amplitude L of the pulse. Particularly preferred is the waveform (a) in consideration of the function of the large-scale integrated circuit. It is also to be noted that the photothermal transducing element H1 may be dispensed with in certain cases for example if the ink itself is black colored and heat absorbent. A photothermal transducing element can be any material which is black in color, heat absorbent, and has good photothermal conversion efficiency.

Figure 5:
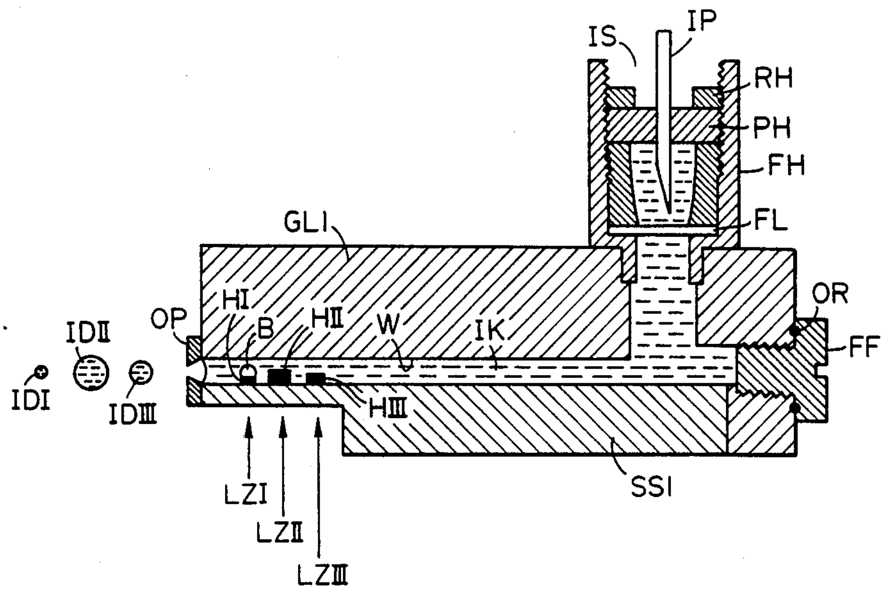
FIG. 5 is a view of an embodiment of the recording head.

FIG. 5 is a cross-sectional view showing another embodiment of the recording head which is fundamentally the same as the foregoing but is provided with plural photothermal transducers HI, HII and HIII. As illustrated, a substrate SS1 having photothermal transducers HI, HII and HIII is mounted on a heat sink and is surfacially covered with a grooved plate GL1 to constitute a liquid chamber W at the junction therebetween. Said grooved plate GL1 is provided with an ink supply inlet IS and a stopper FF with an O-ring OR for eliminating bubbles at the ink supply and for facilitating nozzle cleaning.

The ink supply inlet IS is composed of a filter FL for removing fine dusts, a filter holder block FH for supporting the filter, a pipe holder rubber member PH for supporting an ink supply pipe IP and a rubber holder RH for supporting the rubber member. At the front end of said liquid chamber W there is provided an orifice plate OP for obtaining droplets of desired shape, and the orifice plate may be dispensed with in case the front end of the liquid chamber itself is shaped as an orifice.

As exaggeratedly illustrated in the drawing the liquid chamber W is provided along the longitudinal direction thereof with plural photothermal transducers HI, HII and HIII which are selectively stimulated by laser beams LZI, LZII and LZIII to cause state change in the ink present in contact with the transducers by the generated heat. Such a state change involves the aforementioned generation and annihilation of the bubbles in the liquid, the bubbles being schematically represented by a bubble B. The bubble generation causes, due to volumic change in the liquid chamber, the emission of ink droplets IDI, IDII and IDIII of different sizes obtained through tonal control to be explained in the following. Transducers HI, HII and HIII are formed for example with different thicknesses and/or lengths to obtain different areas or volumes, whereby the volume of bubble formed in the liquid is variable according to the applied energy to form droplets of different sizes. Otherwise a similar effect is achievable by selecting plural of the laser beams LZI, LZII and LZIII simultaneously or in succession.

Figure 6:
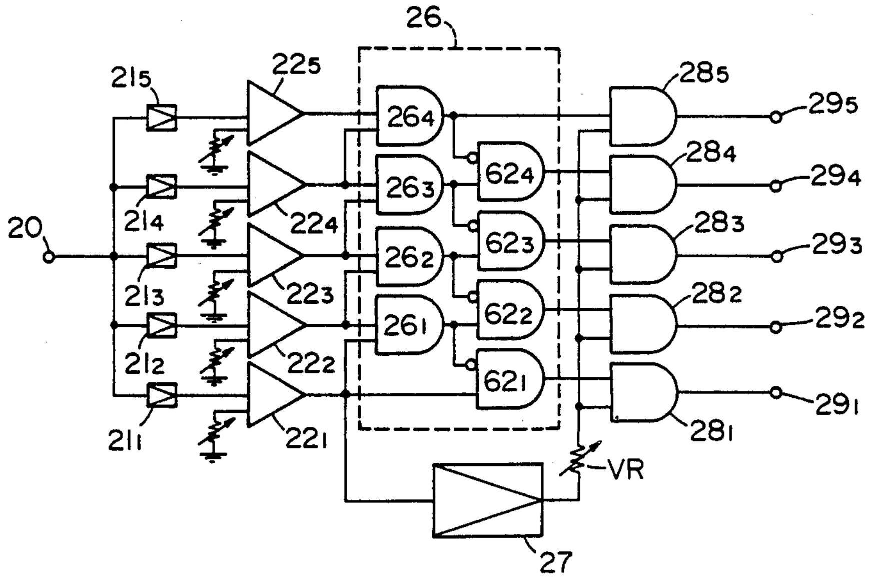
FIG. 6 is a circuit diagram showing an example of the drive circuit.

FIG. 6 is a block diagram showing a control circuit for selective drive for example of five laser sources, in which an analog input signal supplied from an input terminal 20 is guided through buffer circuits $21_1$-$21_5$ to comparators $22_1$-$22_5$. The comparator $22_1$ is designed to generate an output signal in response to a lowest input signal level, and other comparators $22_2$-$22_5$ are designed to respond to successively higher input signal levels.

The output signals from said comparators $22_1$-$22_5$ are supplied to AND gates $26_1$-$26_4$ in a gate circuit 26 whereby only one output AND gate is opened corresponding to the input signal level. On the other hand a drive circuit 27 is activated by the output signal from the comparator $22_1$ to provide an output pulse of desired width and amplitude to AND gates $28_1$-$28_5$, of which only one is opened by the output signal selected by the gate circuit 26 to transmit the output signal from said drive circuit 27 to either one of output terminal $29_1$-$29_5$. In case the terminals $29_1$-$29_5$ are respectively connected to laser sources of successively increasing outputs, there will be activated a laser source of the highest or lowest output respectively corresponding to the highest or lowest input signal level. Also in case the input signal is in the digital form indicating the level in place of the above-explained analog input signal, the selection of the gate circuit and the corresponding laser source can be achieved directly by such input signals without the use of aforementioned comparators.

Figure 7:
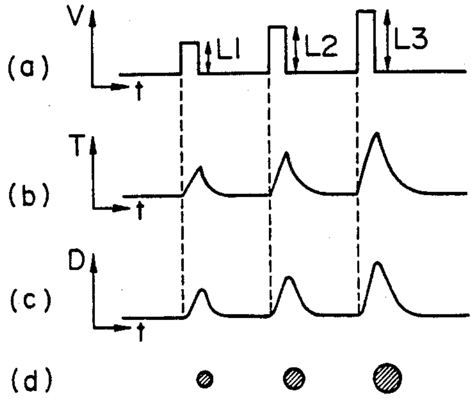
FIGS. 7 and 8 are charts showing various drive signals.
Figure 8:
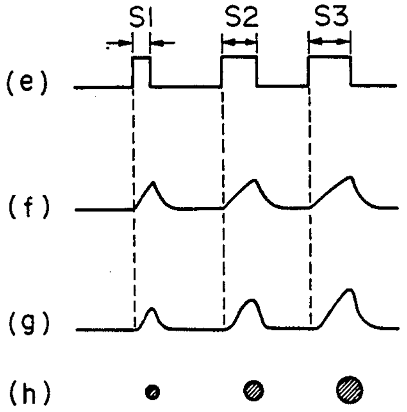

In the following explained in a method of recording with tonal rendition by activating a semiconductor laser with pulses of different waveforms. It has been found that pulses of a same width but increasing amplitude applied to the same semiconductor laser induces the emission of droplets of increasing diameter. Also pulses achieving a same peak temperature but with increasing widths cause the emission of droplets of increasing diameter. These faces are utilized in the control methods shown in FIGS. 7 and 8. In FIGS. 7(a), (b), (c) and (d) respectively show the pulse waveform supplied to the laser, temperature of the recording liquid, volume of the bubble generated therein and recorded dots corresponding to the obtained droplets, in case the pulse amplitude is changed. Along with the increase in the pulse amplitude L, the temperature of the liquid and the corresponding heating energy become higher to generate a larger bubble and thus a larger droplet. FIG. 8 shows a case of changing the pulse width S, in which (e), (f), (g) and (h) respectively show the waveform of the applied pulse, temperature of the recording liquid, volume of the generated bubble and size of the emitted droplet. It will be seen that a pulse giving a determined maximum temperature of the liquid but of a larger width induces a larger bubble and thus a larger droplet. Naturally it is also possible to obtain uniform droplets at a high speed by suitable control of the pulse width S and the amplitude L. Also the tonal rendition control can be automatically achieved in response to the density of an original to be recorded or copied, for example by supplying a signal related to an original reading sensor to the input terminal 20 shown in FIG. 6 or by supplying a signal from a variable resistor linked with a manual density control dial to terminal 20.

Also an arbitrary density control is possible by direct manual regulation of the variable resistor.

Furthermore it is easily possible to constantly maintain optimum image recording despite of time-dependent change of the recording liquid or change in the circumferential conditions of the apparatus such as temperature or humidity, through the control of thermal pulse or bubble by means of the aforementioned heat generating means and heat control means. It is to be noted further that the orifices can be arranged at a high density as the aforementioned photothermal transducing elements are not necessarily essential.

In case the present embodiment is applied to a multi-color ink jet recording apparatus there will be required suitable bubble control for each color, and the foregoing thermal pulse control can be effectively utilized for example for obtaining uniform droplets of different colors.

The bubble control can further be utilized for achieving an intentional color balance, for example a reddish or bluish tone, and for a density control.

Figure 9:
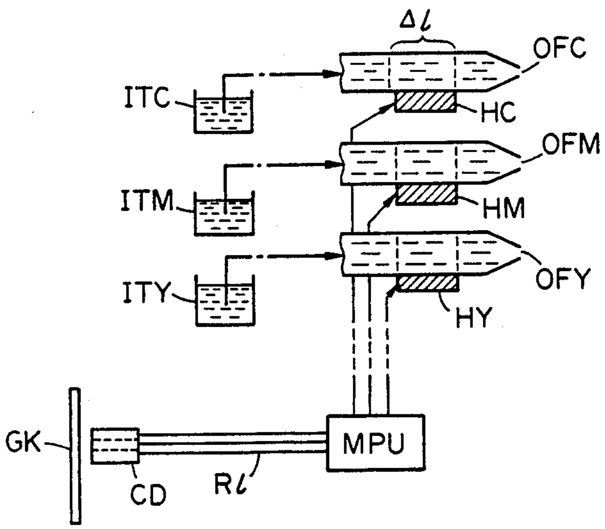
FIG. 9 is a schematic view of a color recording apparatus.

FIG. 9 illustrates, in a schematic view, a multi-color ink jet recording apparatus embodying the present invention. In the following description there will be explained the use of three color liquids C, M and Y as a representative case, but the present invention is not limited to such case but includes any combination of two or more colors.

The apparatus shown in FIG. 9 is provided with ink supply tanks ITC, ITM and ITY, thermal action portions Δl, thermal energy generating means for example aforementioned photothermal transducers HC, HM and HY, orifices OFC, OFM and OFY, respectively corresponding to liquids C, M and Y of different colors. The number of the thermal action portions and the orifices may be further increased, but each flow path from the ink supply tank to the orifice is designed to accommodate only one of the liquids. However it is also possible to mix two or more liquids in the flow path, if appropriate.

The thermal action portions are provided, as explained in the foregoing, for causing bubble generation in the color liquids by thermal energy furnished by the laser beam. The laser beam sources are provided in appropriate positions suitable for causing bubble generation in the liquids present in the thermal action portions.

The laser beam sources are selectively driven by a control or main processing unit MPU according to multi-color input information. In case the apparatus of the present invention is utilized as an output device for a copier or a facsimile apparatus, there will be provided photosensor means CD composed of lenses, filters, photosensor elements etc. for obtaining multi-color information from an original GK. On the other hand, in case the apparatus is utilized as an output terminal for a computer or the like, photosensor means CD is dispensed with as the output signal from said computer or the like is already in the form of multi-color information.

The processing unit MPU includes means for selectively driving laser beam sources in response to multi-color information, for example, in the case of driving laser beam sources with pulse signals, clock pulse generators, shift registers, drive circuits, synchronizing means for determining relative speed between the recording member and the recording head.

The heat generation by the laser can be easily controlled by the control of the width and amplitude of the drive pulse signal in the aforementioned manner.

The recording liquids are suitably selected in relation to the above-mentioned control unit and according to the kinds of recording to be obtained, for example so-called false-color graphic recording, so-called true color recording or two-color recording of black and red for documents or proofs. For example the graphic recording is generally utilized for printing multi-color information from a computer and can be performed with liquids of arbitrary colors.

Also in the case of the true-color recording, the original information is received by three photosensors respectively through red, green and blue filteres to obtain color-separation signals, and the liquids used are of cyan, magenta and yellow colors complementary to the color separating filters. The thermal action portions of the recording head containing said liquids of three colors are selectively activated by the laser beams in response to the color-separation signals.

A particularly preferable result is obtained by the apparatus of the present invention in case the recording head is composed of a structure composed of a substrate, a grooved plate, liquid supply blocks, etc. as will be explained in the following.

Figure 10A:
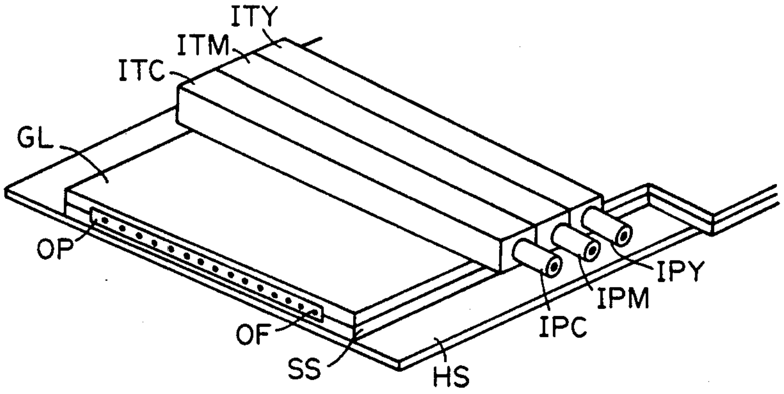
FIGS. 10A and 10B are views showing an embodiment of the recording head therefor.

FIG. 10A shows an embodiment of the present invention in a perspective view, in which the multi-color recording head is composed of a substrate SS1, a grooved plate GL1 having liquid supply grooves, ink tanks ITC, ITM, ITY and ink supply pipes IPC, IPM, IPY for supplying liquids C, M, Y for multi-color recording. There may further be added a heat-conductive substrate HS functioning as a heat sink and an orifice plate OP for forming desired orifices.

Figure 10B:
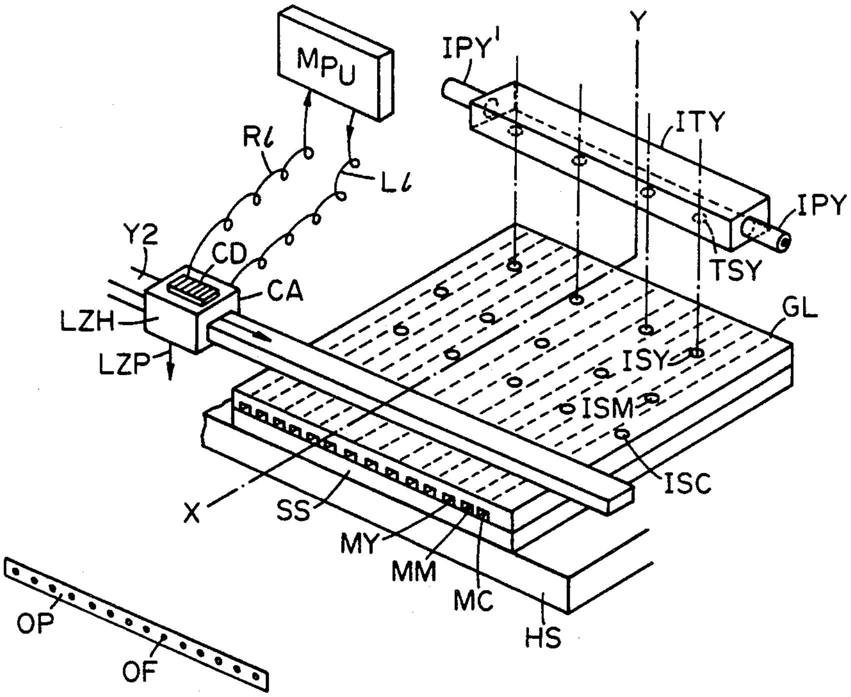

FIG. 10B shows the positional relation between the grooved plate and ink tanks shown in FIG. 10A. The substrate SS1 is composed for example of alumina, while the grooved plate GL1 is composed of a glass or plastic plate having grooves MC, MM, MY for said liquids formed with a diamond microcutter and liquid supply inlets ISC, ISM, ISY. The inlets are formed for example with electron beam process respectively corresponding to the grooves of the same color. The ink tanks ITC, ITM, ITY are provided with holes TSC, TSM, TSY in positions respectively corresponding to said inlets ISC, ISM, ISY. Although FIG. 10B shows only one ink tank TY, other tanks ITC and ITM for liquids C and M are mounted in a similar manner on the grooved plate GL1. The grooved plate and ink tanks prepared in the above-explained manner are integrally united in the corresponding position. IPY′ indicates a pipe for eliminating bubbles at the filling of the liquid into the recording head.

Such structure allows to easily obtain a multi-orifice array in which orifices for emitting liquids of multiple colors are arranged with a high density. It is generally accepted in a multi-color image composed of multiple dots that a positional aberration of dots exceeding 150–170μ will lead to a marked deterioration in tonal reproducibility or in color reproduction. The ink jet recording apparatus of the present invention is capable of providing extremely satisfactory results in the image resolution and tonal reproducibility since the orifices can be arranged with a density exceeding 30 lines/mm, which is well beyond the above-mentioned limit. The apparatus of the present invention is further advantageous in that the orifice array can be realized in an extremely compact structure with a reduced thickness.

There should be made a pixel-to-pixel correspondence between the orifice density and the density of the photosensor elements. Consequently in case of three-color recording with an orifice density of 36 lines/mm, there can be employed a photosensor density of 12 lines/mm.

In the case of using such multi-orifice array for the recording in a copier or a facsimile apparatus, the use of a linear photosensor array as the photosensor means CD is particularly advantageous in that a high-speed recording or a high resolution can be achieved by a single scanning. Such structure is further preferable in that the control unit can be realized in a simple manner without particular delay circuits, memories, etc. for adjusting the drive timing and in that the orifice array can be formed easily.

Also synchronized data reading and recording can be simultaneously conducted at high speed by a linear motor to be explained later if said photosensor means CD is integrally mounted, as shown in FIG. 10B, on a carriage CA supporting the laser head LZH and slidably fitted on a carriage rod Y2. Such arrangement is extremely advantageous in economizing the circuitry and simplifying the structure thus allowing to realize extremely small recording apparatus.

As an example the apparatus shown in FIGS. 10A and 10B was prepared in the following manner.

A grooved plate GL1 having grooves formed with a microcutter at an orifice density of 30 lines/mm and glass ink tanks ITC, ITM and ITY were adhered onto a substrate SS1, to which also adhered was an aluminum heat sink HS for heat dissipation.

The ink tanks ITC, ITM and ITY were respectively filled with cyan, magenta and yellow inks, and in this manner there was prepared a recording head of an orifice density of 30 lines/mm having 1200 orifices in total or 400 orifices for each color.

Figure 10C:
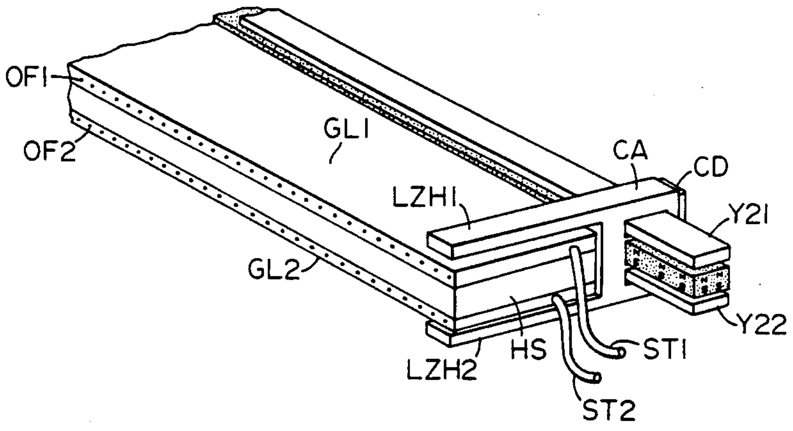
FIG. 10C is a view showing another embodiment of the recording head.

The recording head was combined with photosensor means and a control circuit and used in recording with laser pulses corresponding to cyan, magenta and yellow image signals, while said inks were supplied to the recording head with such a pressure as not to cause ink emission from the orifices in the absence of heat generation in the inks. In this manner obtained at a very high recording speed was a color image showing satisfactory resolution and tonal rendition. FIG. 10C shows another embodiment of the recording head for printing two colors of black and red, wherein grooved plates GL1 and GL2 respectively contain black and red inks and emit the inks from orifices OF1 and OF2. Laser heads LZH1 and LZH2 are integrally displaced by a linear motor to be explained in the following. A heat sink HS is used commonly for the upper and lower ink jet nozzles. A double recording speed is also obtainable if both ink jet nozzles are utilized for a same color. These mechanisms are particularly preferable for miniaturization of the recording apparatus. In the foregoing example of recording with the recording head shown in FIGS. 10A and 10B, the image may appear, for example, with yellowish color in areas which should appear in neutral gray and with a deficient density in the entire area.

Figure 11:
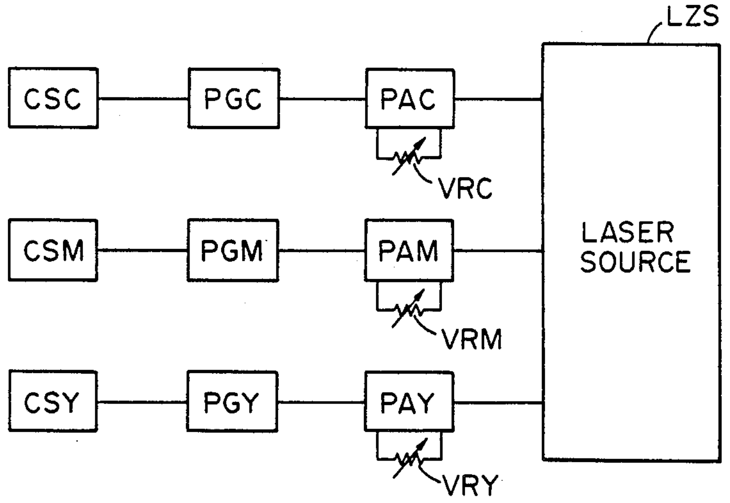
FIG. 11 is a block diagram showing an example of the drive circuit therefor.

In such case variable resistors VRC, VRM and VRY of the control device shown in FIG. 11 were regulated in such a manner as to provide drive pulses for yellow color different from those for cyan and magenta colors. In this manner it was possible to obtain well balanced neutral gray with improved image density.

The materials used in the foregoing example are shown in following Table 1:

TABLE 1

| | |
|---|---|
| Recording Member | |
| Bond paper; Seven Stars (tradename) A-size 28.5 kgs (Hokuetsu Paper Mills, Ltd.) | |
| Inks | |
| Y: Yellow | |
| Yellow RY (Orient Chemical) | 2.0 grs. |
| ethanol | 80.0 grs. |
| diethylene glycol | 18.0 grs. |
| M: Magenta | |
| Red BT | 3.0 grs. |
| ethanol | 80.0 grs. |
| diethylene glycol | 17.0 grs. |
| C: Cyan | |
| Blue RL | 2.0 grs. |
| ethanol | 80.0 grs. |
| diethylene glycol | 18.0 grs. |

In FIG. 11 there are shown circuits CSC, CSM and CSY each containing a photosensor and an analog-to-digital converter, pulse generators PGC, PGM and PGY for generating drive pulses in response to the output signals from said circuits CSC, CSM and CSY, amplifiers PAC, PAM and PAY for amplifying said output signals, and variable resistors VRC, VRM and VRY for regulating the width and amplitude of each pulse.

In the aforementioned manner it is rendered possible, by the regulation of said variable resistors, to prepare optimum laser signals and thus optimum bubbles for the inks C, M and Y respectively containing different dyes as shown in Table 1 and to meet the aforementioned various requirements in a simple manner. It is also very easy to regulate said variable resistors automatically in relation to the output signals from original reading sensors or to the facsimile signals instead of manual regulation.

Figure 12:
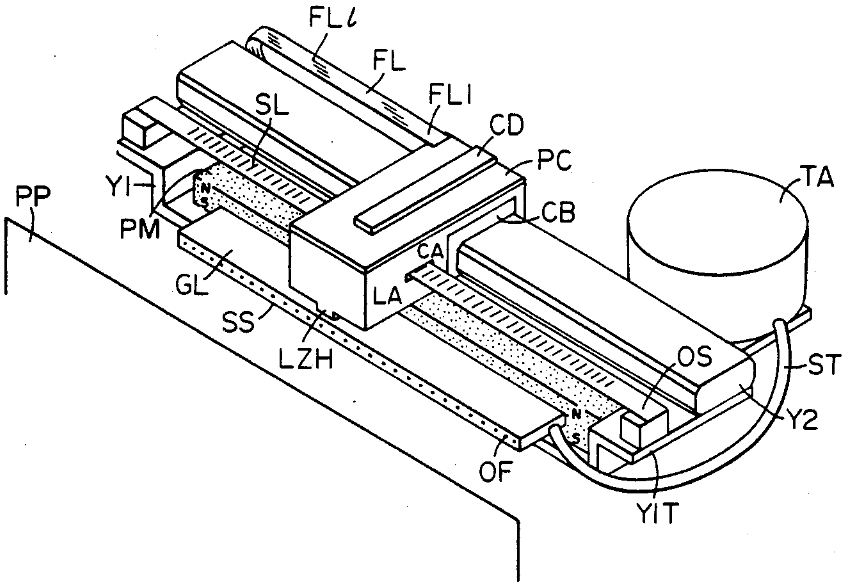
FIG. 12 is a perspective view of an embodiment of the apparatus of the present invention.
Figure 13:
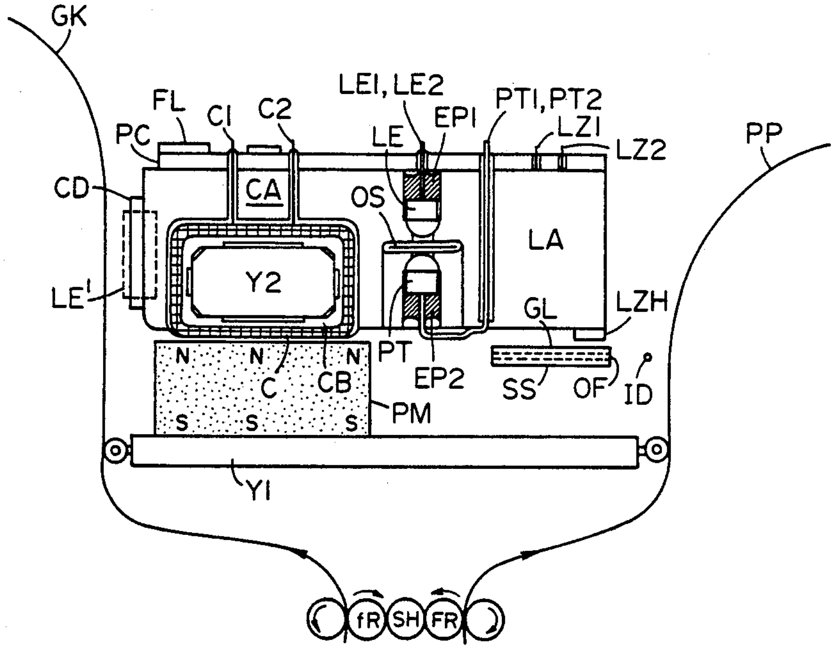
FIG. 13 is a cross-sectional view of another embodiment.

FIG. 12 is a schematic view of the recording apparatus employing an embodiment of the present invention, while FIG. 13 is a cross-sectional view showing a modification of the apparatus shown in FIG. 12.

In these apparatus a linear motor is utilized for displacing a carriage CA supporting a solid laser device.

The linear motor is provided with a closed magnetic circuit composed of a permanent magnet PM, a magnetic plate Y1 and a magnetic guide member Y2, and a coil C wound on a coil bobbin CB slidably mounted on said guide member Y2 is electrically energized to displace a carriage CA integral with said coil bobbin CB according to Flemming's left-hand rule. The reciprocating motion of the carriage on said guide member Y2 is achieved by changing the direction of current supplied to the coil C. A signal generating plate, for example a non-magnetic optical slit plate OS, is fixed on both ends thereof to the bent end portions Y1T of said magnetic plate Y1, together with said guide member Y2 and parallel thereto. The carriage CA is provided with the coil bobbin CB for the coil C, slit detecting means for example composed of a light-emitting diode LE and a phototransistor PT respectively fixed with adhesive materials EP1, EP2, a photosensor element CD, and a printed circuit board PC. Printed circuit board PC is electrically and mechanically connected to the terminals C1, C2 of coil C, drive terminals LZ1, LZ2 of the solid laser device LA, terminals LE1, LE2 of the light-emitting diode LE, terminals PT1, PT2 of the phototransistor PT and terminals of said photosensor element CD. These signals lines are connected at an end portion of the printed circuit board PC to an end FL1 of a flexible cable FL, which is folded back in the middle and connected at the other end to an unrepresented connector for achieving control on the displacement of the carriage CA and on the laser device LA through said flexible cable FL. An ink supply tube ST for ink supply from an ink tank TA is connected to a plate GL of the recording head. The optical slit plate OS is positioned between the light-emitting diode LE and the phototransistor PT. Along with the displacement of the carriage, the infrared light emitted by the light-emitting diode LE causes, through slit portion LS of the slit plate OS and also through an unrepresented receiving slit of the same size mounted on phototransistor PT, repeated on-off actions of phototransistor PT to generate timing pulses TP. Timing pulses TP are utilized for detecting the speed and position of the carriage CA and for controlling the carriage speed, laser device and stepping motor for paper feed. In the case of a row printing, the characters therein are composed of dot matrixes. In response to a print instruction signal the carriage initiates displacement, and drive pulses are supplied to the laser device NP at determined positions of the carriage detected by said timing pulses TP, whereby laser pulses are emitted from the laser head LZH to cause ink droplet emission thereby performing the recording of a dot line on the recording paper PP. Upon completion of the recording stepping motor (not shown) for paper feed is rotated by an amount corresponding to a dot pitch and the carriage is simultaneously displaced to the reverse direction.

Upon completion of printing of a row composed of a determined number of dot lines (for example seven dot lines) through the repetition of the above-explained procedure, the recording paper is advanced by an amount corresponding to the spacing between rows by means of said stepping motor, thereby completing the printing of a row. Thereafter the carriage CA is displaced to and stopped at a determined position.

As illustrated in FIG. 13, the photosensor element CD may be mounted on a face of the carriage CA opposite to the recording face thereof. Also in an application in a small copier, the stepping motor SM for advancing the recording paper may be utilized for synchronized feeding of the original GK, thereby achieving a miniaturized apparatus and avoiding eventual aberration in the recording. It is furthermore advantageous to mount a light-emitting diode LE' for illuminating the original GK in the vicinity of said photosensor element CD.

As explained in the foregoing, the apparatus for the present embodiment can be realized in a small, thin and simple structure without disturbing the magnetic field as the guide member and the non-magnetic slit plate are mounted parallel to the magnetic plate of the permanent magnet.

Also the apparatus of the present embodiment is extremely quiet because of the absence of a conventional rotary motor and associated gears, links, racks, etc. for the carriage displacement and also of ratchets, plungers, etc. for the paper feeding.

Furthermore the sliding contact of the carriage with the signal generating plate eliminates the ink eventually deposited thereon, thereby preventing the danger of failure in the detecting means.

Also the use of a printed circuit board connected to various electric parts and mounted on the carriage allows easy and inexpensive manufacture, and the use of a flexible cable ensures free and easy displacement of the carriage.

Figure 14:
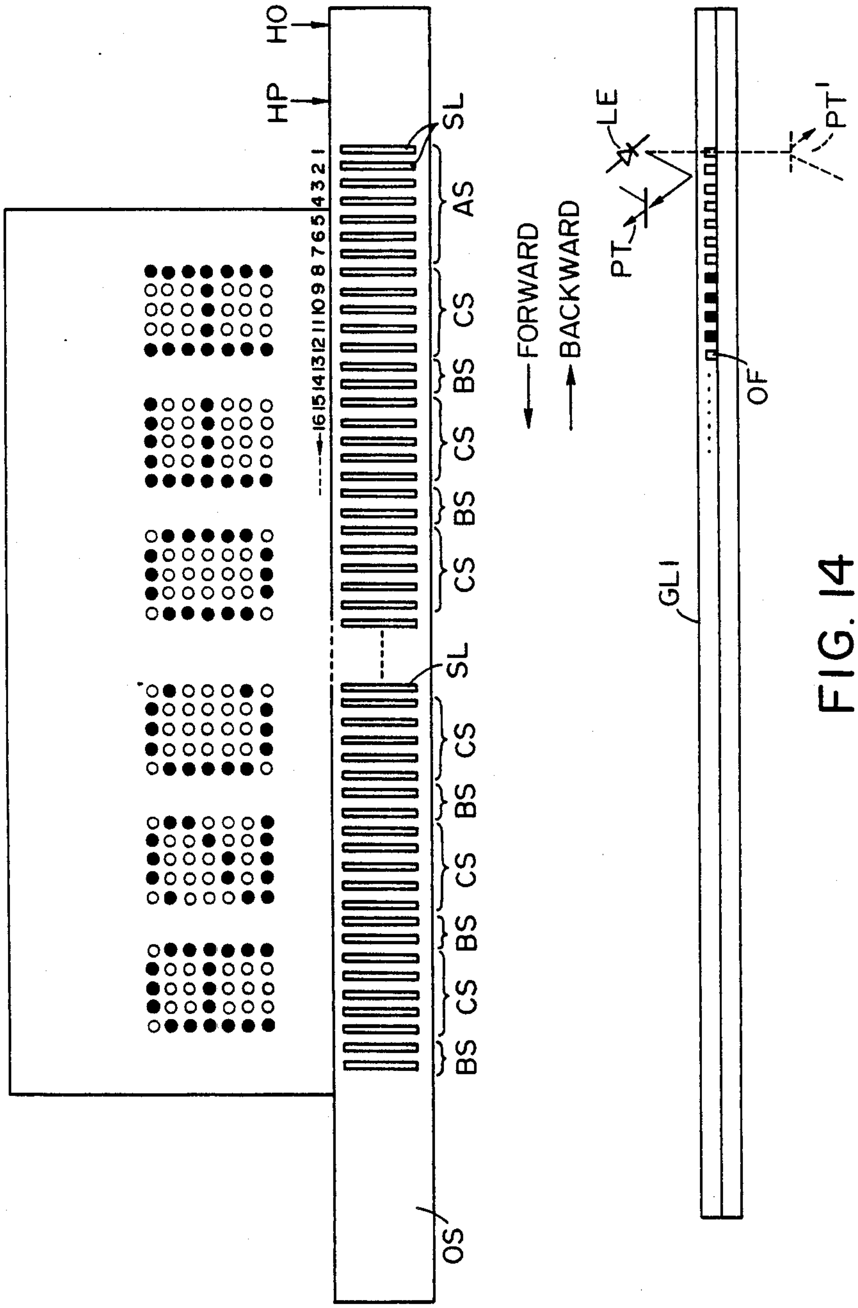
FIG. 14 is a magnified view of the graduation plate.
Figure 15A:
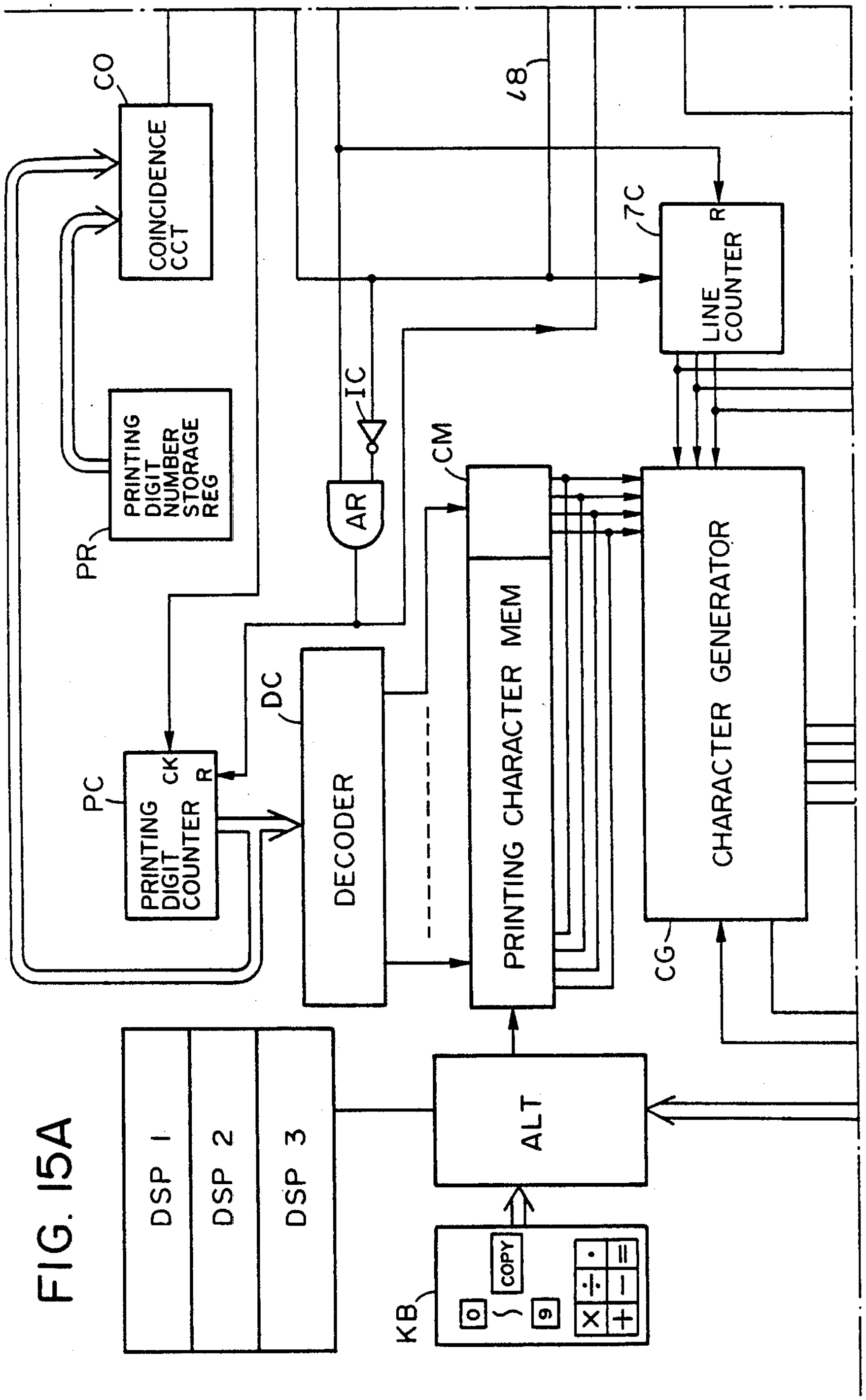
FIGS. 15A through 15D, when combined as shown in FIG. 15, are a diagram of the control block.
Figure 15B:
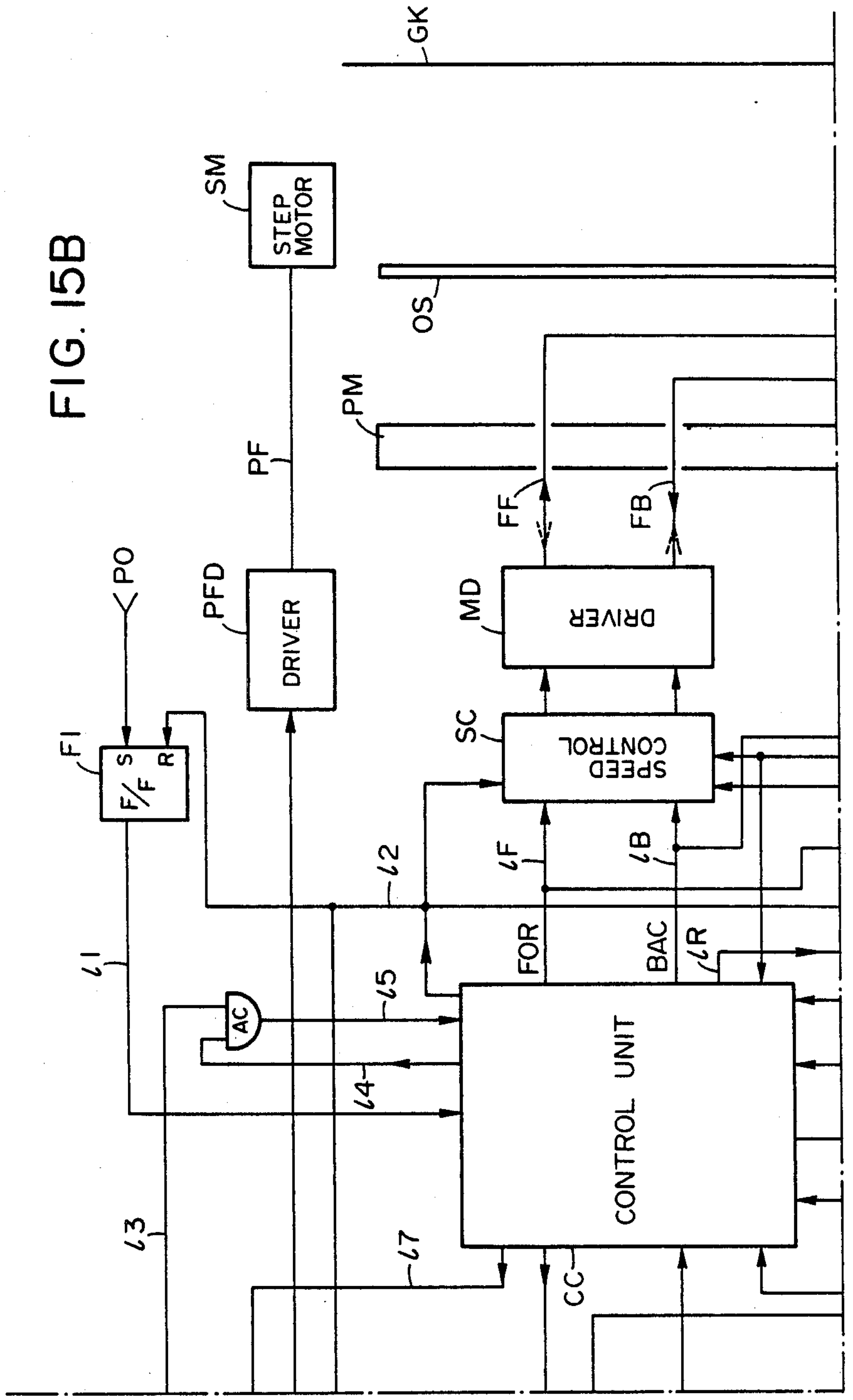
Figure 15C:
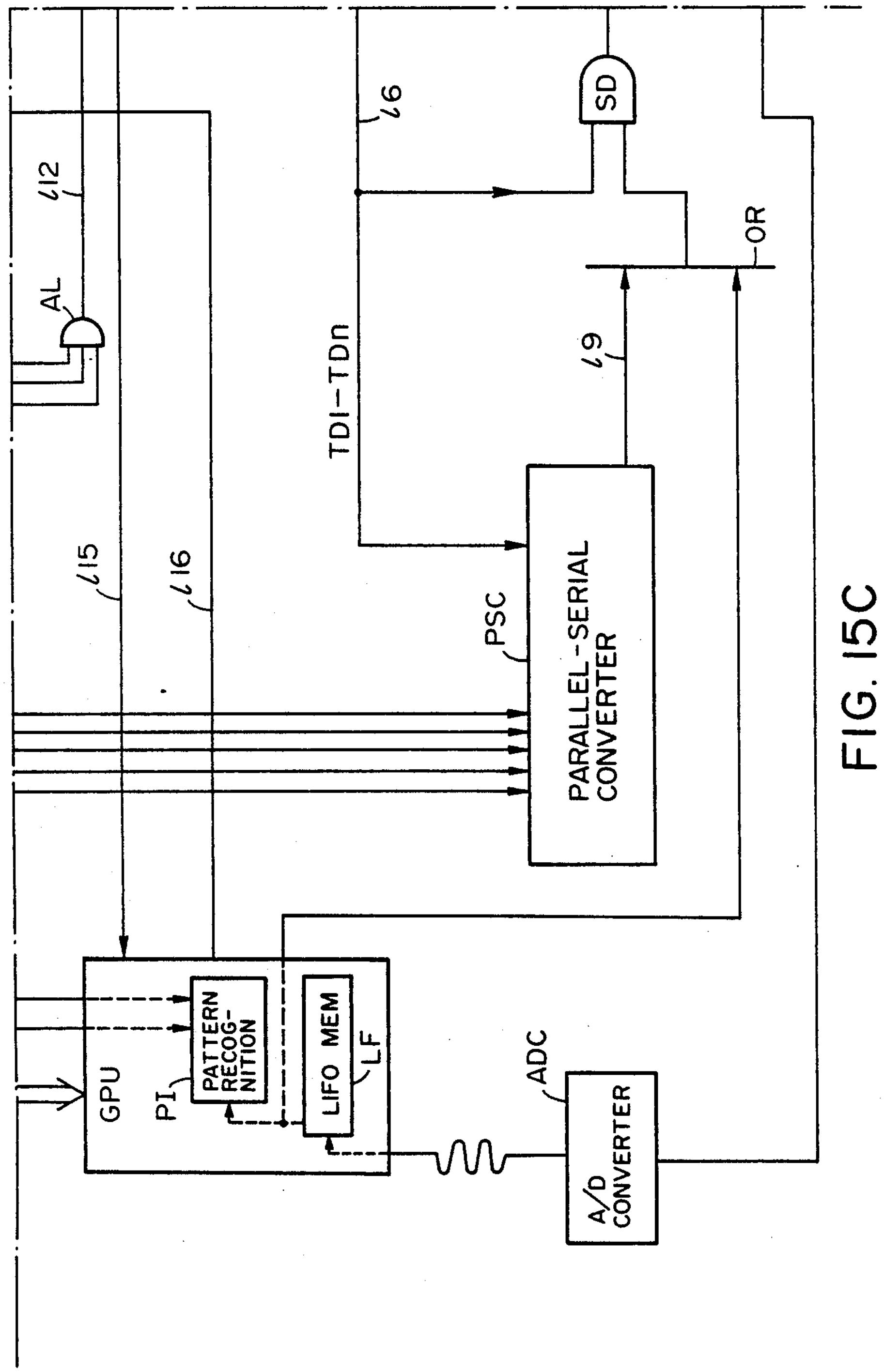
Figure 15D:
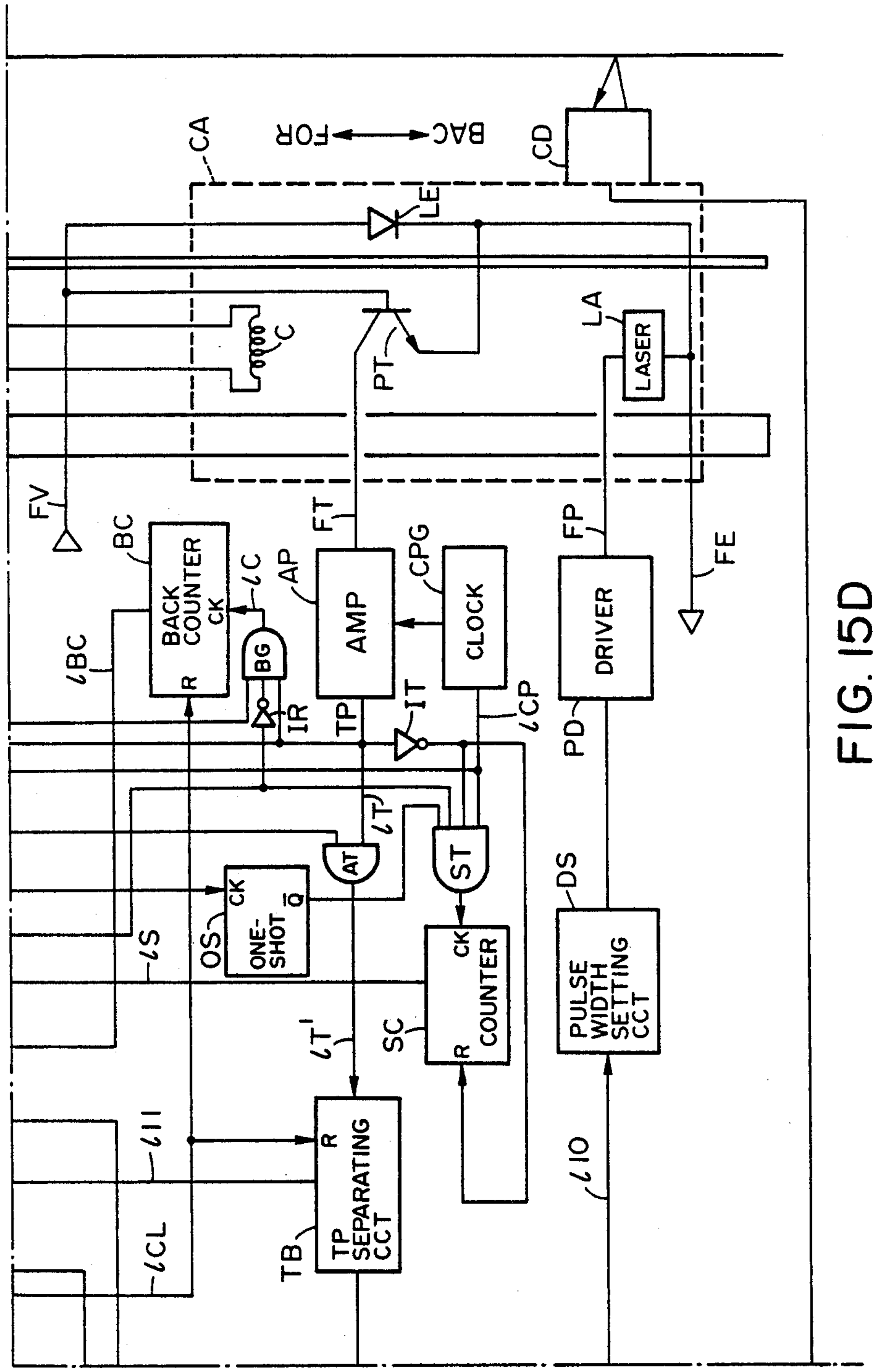

In the above embodiment the optical slit plate OS is provided with slits SL as shown in FIG. 14 for the control of position and speed of the carriage.

Slits SL are provided beyond the lateral width of the recording paper PP in order to regulate the speed of the carriage CA after the start of displacement thereof from a home position HP or HO and before the counting of 8 slits. The printing of the first character is started at the 8th slit and completed within 5 slits from 8th to 12th. The two succeeding slits (13th and 14th) are used as a blank before the succeeding character, and the foregoing procedure is repeated thereafter. In FIG. 14 AS, CS and BS respectively indicate approach slits for detecting the position for starting the printing, character slits for character printing and blank slits for forming blanks, slits and spacings therebetween being utilized also for achieving a constant speed of the carriage.

The signal generating plate (optical slit plate) OS requires considerably accurate positioning and may present difficulty in the manufacture. In place of such a slit plate it is also possible to utilize the grooves of the grooved plate GL1. As shown in the lower part of FIG. 14 the grooves formed on the glass plate GL1 corresponding to the orifices present different reflectance or transmittance from that in the ungrooved portion of the plate, so that said grooves can be detected by the phototransistor PT in a similar as said slits. The detection is further facilitated in case the grooves are filled with the ink.

FIGS. 15A through 15D, when combined as shown in FIG. 15, show an example of the control circuit for the present embodiment, wherein lead wires FF, FB, FV, FT, FP and FE are formed as integral wires FLl in flexible cable FL shown in FIG. 12 to facilitate the carriage displacement. Upon turning on of the power supply in the circuit shown in FIG. 15, a control unit CC maintains a signal line l2 at the 0-level for a determined period to reset a flip-flop F1, to clear a printing digit counter PC, a line counter 7C, a timing pulse separating circuit TB and a backward counter BC through a gate AR, to activate a one-shot multivibrator OS and to supply a 1-level signal to a gate ST through a signal line lR.

Also signal lines lF and lB for driving the coil C are respectively shifted to 0-level and 1-level to displace the carriage CA in the backward direction toward the home position HO shown in FIG. 5.

Figure 16B:
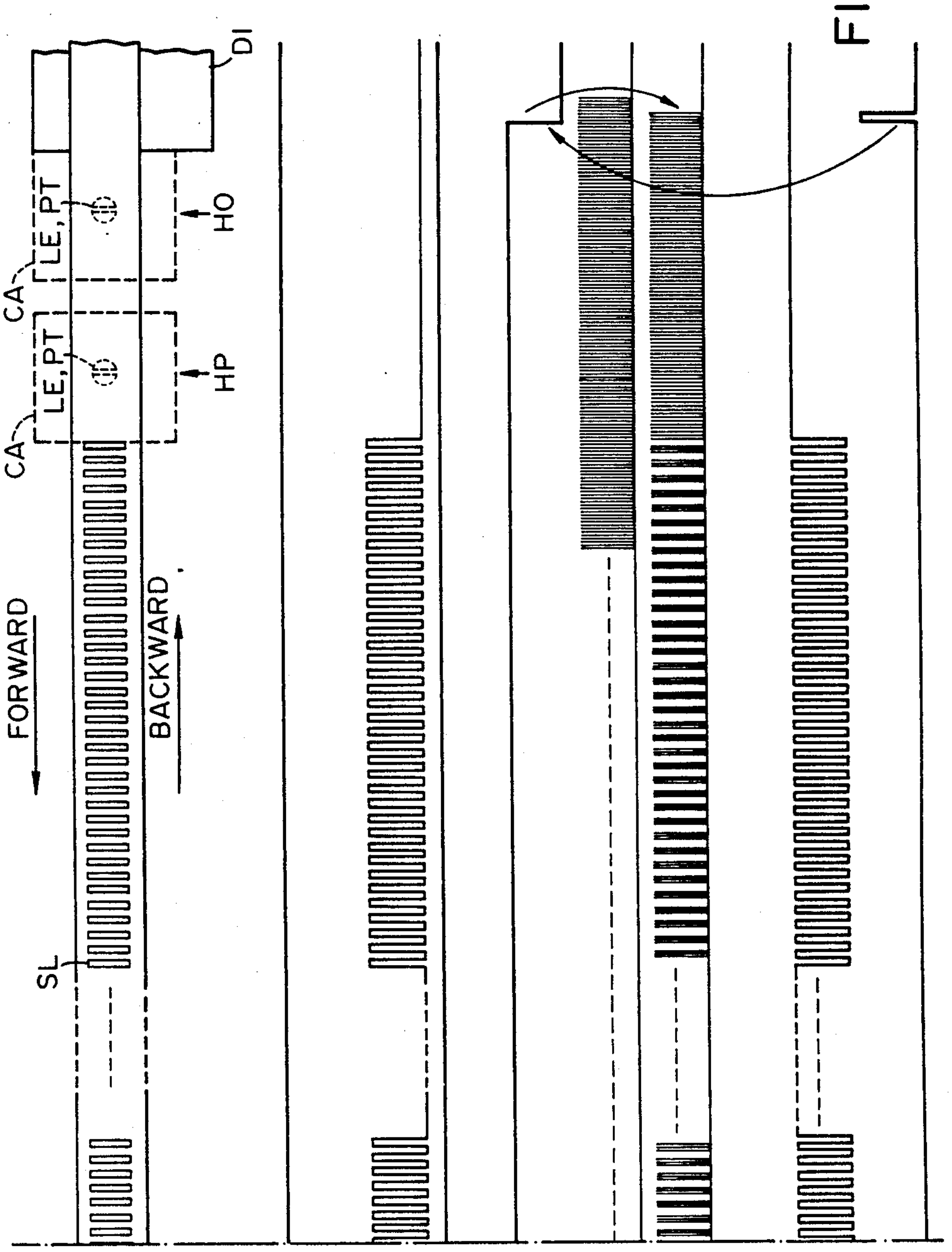

The functioning time of the one-shot multi-vibrator OS is so selected as to allow displacement of the carriage CA for example to a position HM shown in FIG. 16 even when it is initially located at the left-end position.

In case the carriage is positioned at HE, along with the above-mentioned coil drive, the light is transmitted through slits SL to generate, through an amplifier AP shown in FIG. 15, timing pulses TP on a signal line lT, signal TP being inverted by an inverter IT into a signal $\overline{TP}$ which is supplied to the gate ST. Gate ST is however closed during the functioning time of the one-shot multivibrator MOS, so that timing pulses TP and the output pulses from a clock pulse generator CPG are not supplied to a counter SC.

In the meantime the carriage is displaced from the position HE to HM, and, after the expiration of the functioning time of one-shot multivibrator OS, the output pulses of clock pulse generator CPG are counted by the counter SC only during the high-level state of signal $\overline{TP}$.

Figure 17A:
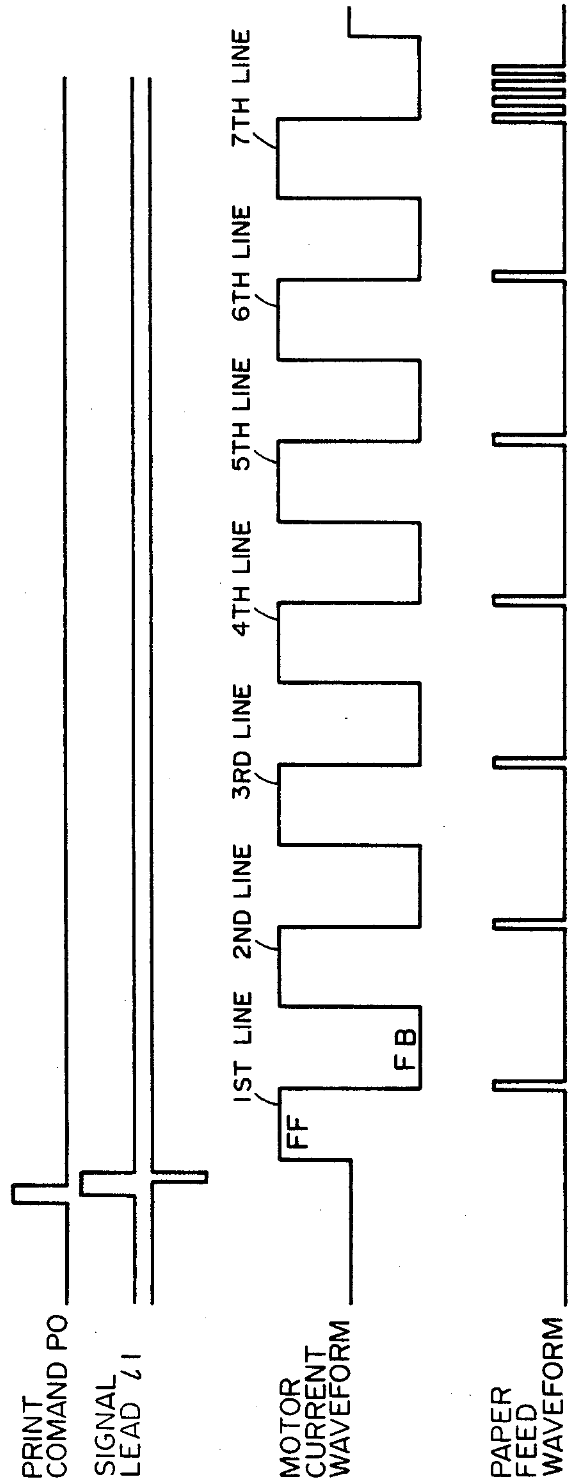
Figure 17B:
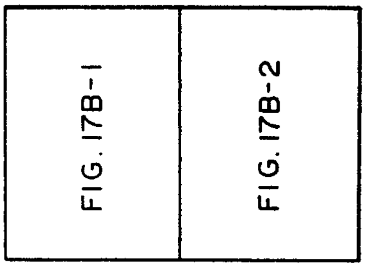
Figures 1, 17B:
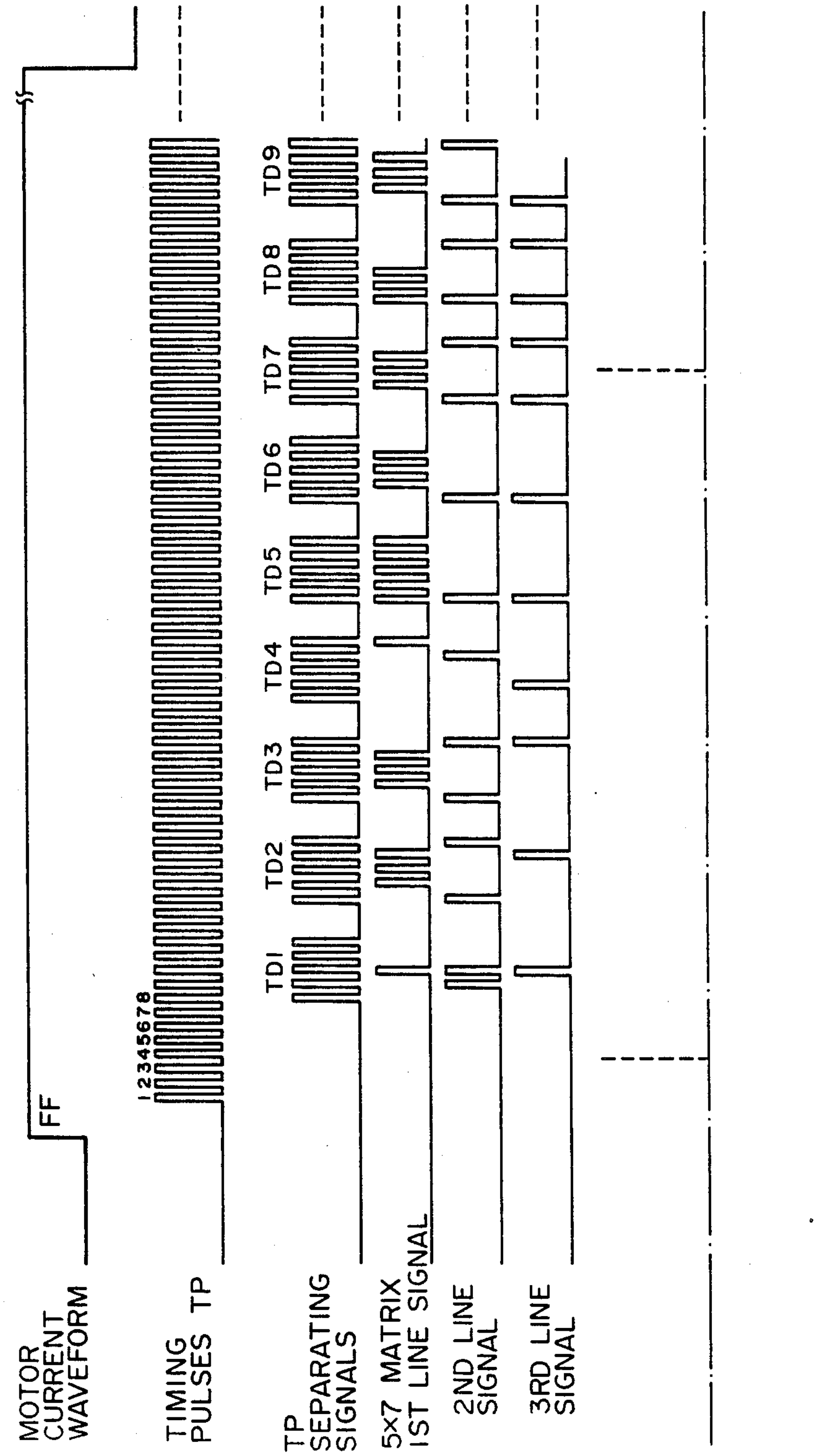
Figures 2, 17B:
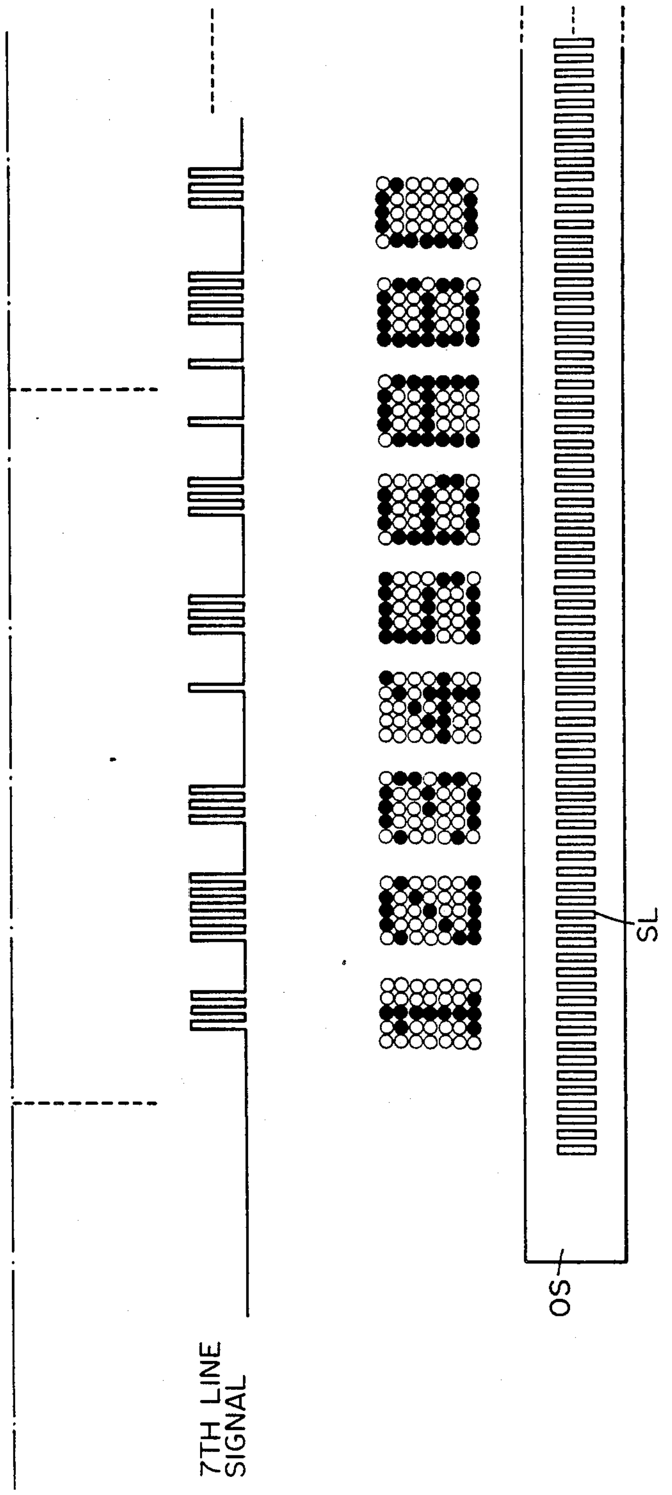

The counter however provides no output signal, as it is reset by the trailing end of the signal $\overline{TP}$ at the passage of the carriage CA through a translucent slit SL. The capacity of counter SC is selected satisfactorily larger than the number of pulses of clock pulse generator CPG received during the passage of an opaque portion or during the displacement of the carriage to its home position HO. Consequently, upon arrival of the carriage CA at the home position HO, the counter SC performs the pulse counting for a determined period and releases an output signal to a signal line lS. In response to the signal indicating the arrival of the carriage at the home position, the control unit CC shifts the signal line lB to 0-level to terminate the carriage displacement and also the line lR to 0-level to close the gate ST, whereby the input signal to a gate BG obtained through the inverter is shifted to 1-level. D1 and D2 shown in FIG. 16 represent cushioning members composed for example of a foamed material for absorbing the collision of the carriage and the noise associated therewith. The information to be printed is supplied from a keyboard KB and through an arithmetic logic unit ALT and stored in a print character memory CM. In response to a print instruction PO shown in FIG. 17A, the flip-flop F1 is set to shift the control unit CC to the print operation mode through the output signal line l1, whereby the control unit CC maintains again the signal line l2 at the 0-level for a determined period to reset the flip-flop F1 and to clear the print digit counter PC, line counter 7C, backward counter BC and timing pulse separating circuit TB.

Also the one-shot multivibrator MOS is simultaneously activated, but the counter SC is not affected since the gate ST is closed due to the 0-level state of the signal line lR. However the gate BG remains opened through the signal obtained from the inverter IR. After the resetting and clearing operations, the control unit CC shifts the signal line l4 to the 1-level state to open a gate AC, and detects the presence or absence of coincidence between the content of the print digit counter PC (hereinafter simply called digit counter) and that of a print digit number register PR (hereinafter simply called digit register) through a signal line l3, gate AC and a signal line l5. In the absence of coincidence the control unit CC shifts the signal line lF to 1-level state to drive the coil C with a driver circuit MD, thereby displacing the carriage in the forward direction.

In case the digit counter PC stores a number "0" while the digit register PR stores a number "n" corresponding to the number of digits in a row, a coincidence circuit CO releases a signal in reponse to which the control unit CC performs the above-explained drive.

Along with the forward displacement of the carriage, the detecting means LE, PT is displaced on the slit plate OS whereby the amplifier AP releases timing pulses TP which are supplied through a gate AT opened by the 1-level state of the signal line lF to the timing pulse separating circuit TB and divided into 5-pulse groups TD1–TDn each for the printing of a character, of which the first group TD1 is at first supplied to a parallel-serial converter PSC and a gate SD through a signal line l6.

The number of digits to be printed in a row is previously stored in the print digit register PR, and the digit to be printed is counted by the digit counter PC of which output signal is received by a decoder DC to select the content of the print character memory CM.

The content thus selected is supplied, under the control by the line counter 7C, as 5-bit output signal from a character generator CG.

Figure 18:
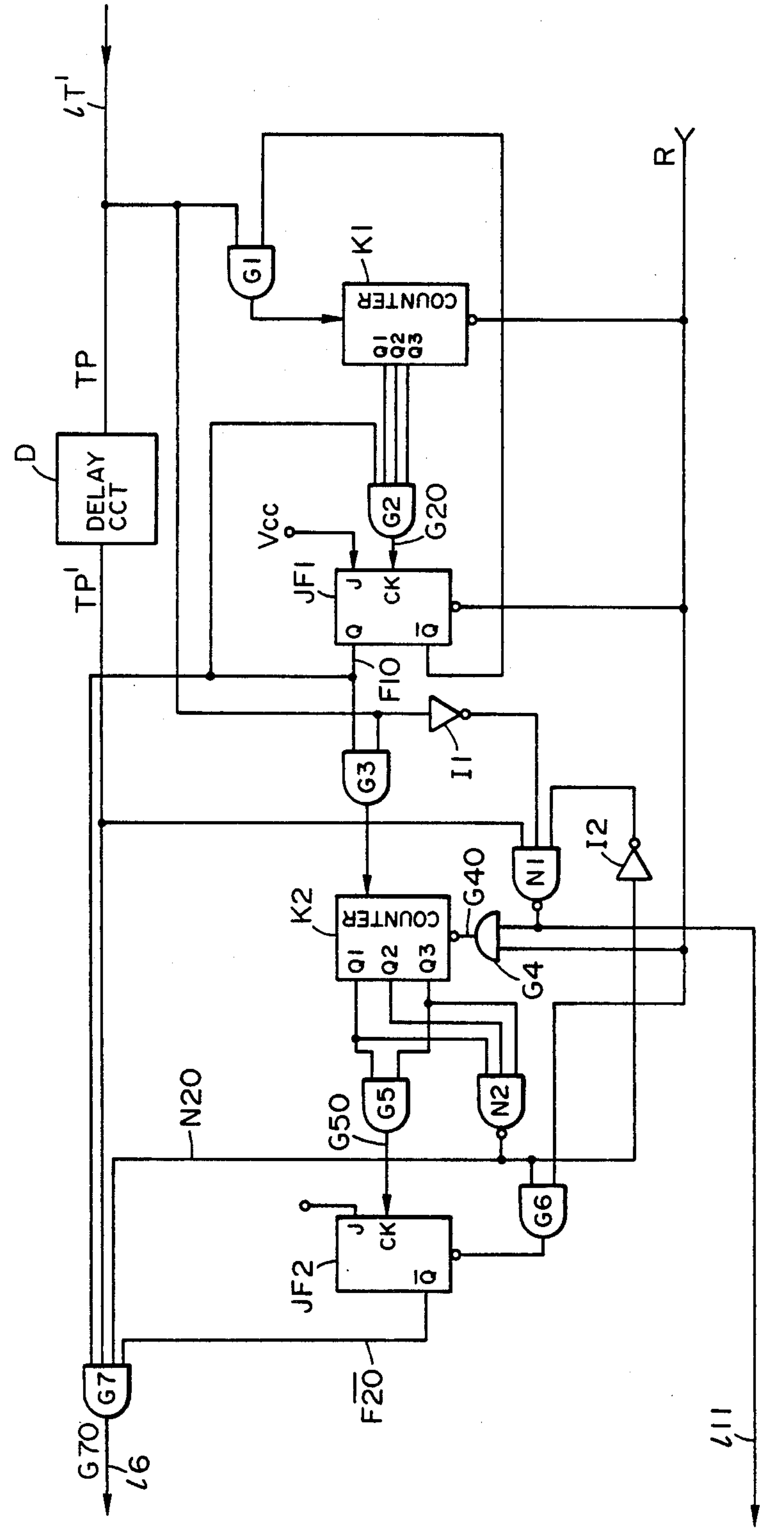
FIG. 18 is a circuit diagram showing the details of a part of the circuit.
Figure 19:
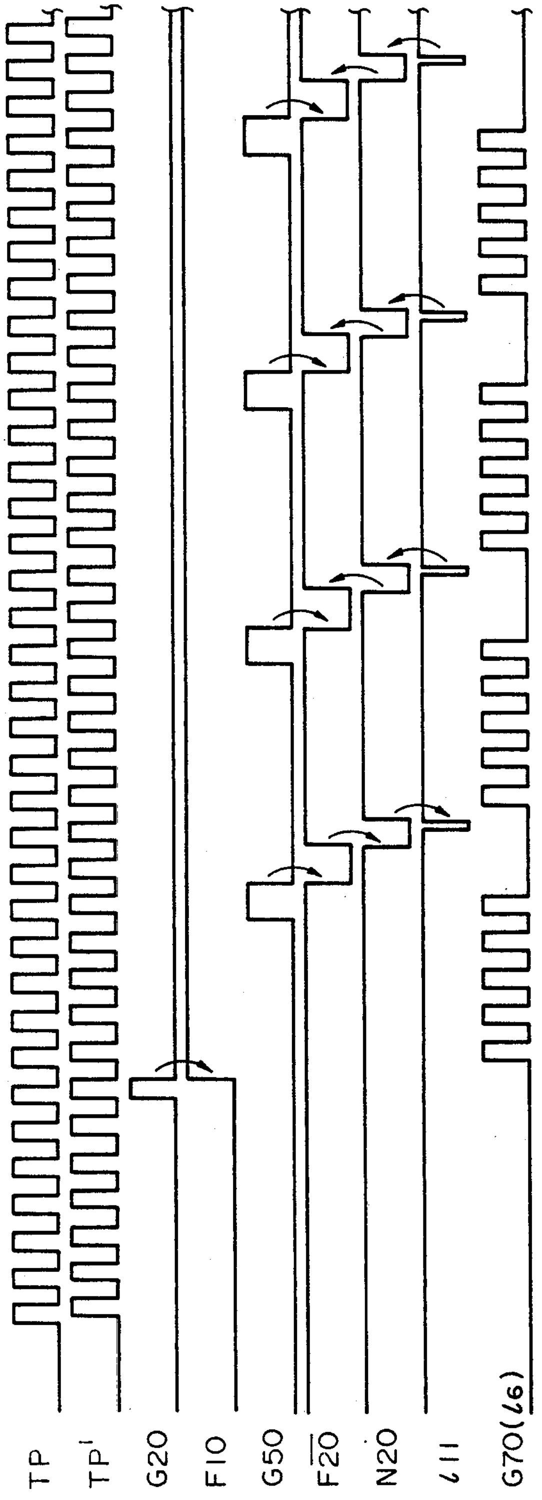
FIG. 19 is a waveform chart showing the function thereof.

The 5-bit print signals are supplied to the parallel-serial converter PSC, of which output signals are supplied through a gate SD opened during the high-level state of the signal line l9 to a pulse width setting circuit DS. In this manner a pulse of a determined width is supplied to drive a laser driver PD, whereby a laser divice LA is activated to cause ink droplet emission for achieving the printing in response to every signal received by said pulse width setting circuit DS. The timing pulse separating circuit shown in FIG. 15 is for example composed, as shown in FIG. 18, of a delay circuit D, counters KI, K2, flip-flops JF1, JF2, AND gates G1–G7, NAND gates N1, N2 and inverters I1, I2. The circuit operates according to the timing chart shown in FIG. 19 to generate signals TD1–TDn through the output signal line l6.

The foregoing steps are conducted for the printing of five dots constituting the first line in seven lines of a 5×7 dot matrix of the first digit (character) in the first print row. The completion of the printing of the five dots is detected through a signal line l11 by the control unit CC which then step advances the digit counter PC through a signal line l7. Subsequently the coincidence circuit CO compares the content of the digit register PR with that of the digit counter PC and transmits the result of comparison through a signal line l3 and the gate AC opened by a signal line l4 to a signal line l5, and in the case of the absence of coincidence the control unit CC performs the printing of a character stored in the print character memory CM corresponding to the step advanced content of the digit counter PC by means of the succeeding 5-pulse signals TD2 from the separating circuit TB.

The above-explained steps of step advance of the digit counter, memory readout and data entry into the parallel-serial converter PSC are sufficiently executed before the release of the five pulses as the clock pulse frequency is sufficiently higher than the timing pulse frequency. In this manner the selective dot printing is performed in succession for the first line of the first print row in response to the signals TD3, TD4, . . . , TDn. Upon completion of the carriage scanning over all the digits to be printed, the coincidence circuit CO detects the coincidence of the content of the digit counter PC with that of the digit register PR and releases a coincidence signal through the gate AC opened by the signal line l4 to the signal line l5, the control unit CC shift a signal line l8 to the 1-level state for a determined period to perform paper feeding by a driver PFD, to clear the digit counter PC, separating circuit TB and backward counter BC through the gate AR and to step advance the line counter 7C. At this point the control unit CC identifies that the 7th print line is not yet reached since the output line l12 of a gate AL indicating the logic product of the outputs of line counter 7C is still in the low-level state.

Then the control unit CC shift the signal line lF and lB respectively to the 0-level and 1-level state to initiate backward displacement of the carriage. In this state the timing pulses TP are entered into the backward counter BC through a signal line lC as the gate BG is opened by lR=0 and lB=0. The backward counter BC counts the number of slits during the backward displacement of the carriage. Upon completion of counting of all the slits the control unit CC identifies, through a signal line lBC, that the carriage has reached a position outside the slit area and slightly in front of the home position HP shown in FIG. 16, and shifts the signal line lB to zero thereby terminating the backward drive of the carriage CA. During the backward displacement of the carriage the printing is not performed since the gate AT is closed by the 0-level state of the signal line lF to forbid the entry of timing pulses TP into the separating circuit TB.

Subsequently the control unit CC performs the printing of a succeeding line indicated by the line counter 7C since it is already identified through the signal line l12 as already explained that the 7th line of 5×7 dot matrix is not yet reached.

In this state the content of said line counter 7C is step advanced from 0 to 1 to indicate the 2nd line in the character generator CG, and the control unit CC shifts the signal lines lF and lB respectively to 1-level and 0-level to activate the driver MD, to open the gate AT and to close the gate BG in a similar manner as in the printing of the first line. Thus the carriage stopped at the home position HP is displaced in the forward direction, whereby the detecting means LE, TP shown in FIG. 13 optically detect the slits SL to generate timing pulses TP which are separated into grouped signals TD1–TDn by the separating circuit TB. In a similar manner as explained in the foregoing, the character of the first digit in the print character memory CM is selected through the decoder DC by the output of the digit counter PC, and in response thereto and to the content of the line counter 7C, the character generator CG releases the data of the second line in the 5×7 dot matrix. The data are supplied in succession, from the parallel-serial converter PSC in response to a 5-pulse group from the separating circuit TB, to the pulse width setting circuit DS to drive the driver PD for a determined period to perform the printing of the second line of the first digit.

The printing of the second line is thereafter conducted for all the digits in the row in the same manner as for the first line.

Upon completion of the printing of the second line identified by the coincidence circuit CO, the control unit CC performs the paper feeding through the signal line l8, clears the digit counter PC, separating circuit TB and backward counter BC and step advances the line counter. Then the control unit CC identifies, through the low-level state of the output line l12 of the gate AL, that the printing of 7th line of the 5×7 dot matrix is not yet completed, and shifts the signal lines lF and lB respectively to 0-level and 1-level to initiate backward displacement of the carriage. Upon completion of the counting of all the slits SL by the backward counter BC, the control unit CC terminates the drive of coil C to stop the carriage CA at the home position HP outside the slit area.

Thereafter the printing of the succeeding line indicated by the step advanced content of the line counter 7C is conducted in a similar manner.

Upon completion of the printing of the 7th line, the control unit CC performs the paper feeding of one line, clears the digit counter PC, separating circuit TB and backward counter BC and step advances the line counter 7C.

At this point the control unit CC identifies the 1-level state of the output line l12 from the gate AL indicating the completion of 7th line printing of the 5×7 dot matrix.

Then the control unit CC identifies the presence or absence of succeeding print instruction through the state of the output line l1 of the flip-flop F1. In case signal line l1 is in the 1-level state indicating that the printing operation is still to be continued, the control unit CC shifts the signal line lF and lB respectively to 0-level and 1-level to reverse the carriage CA to aforementioned home position HP by terminating the coil drive in response to the output of the backward counter BC supplied through the gate BG, in a similar manner as in the foregoing. At the same time the driver PFD is further activated through the signal line l8 to conduct paper feeding of three lines.

Subsequently the control until CC stores the information of the succeeding print row into the print character memory CM and maintains the signal line l2 at the 0-level for a determined period in the same manner as in the printing of the preceding row to reset the flip-flop F1, and to clear the digit counter PC, line counter 7C, backward counter BC and timing pulse separating circuit TB through the gate AR. The one-shot multivibrator MOS is also activated but the counter SC is not affected since the gate ST is closed by the 0-level state of the signal line lR. The gate BG remains opened in this state.

The coincidence circuit CO compares the content of the digit counter PC and that of the digit register PR and supplies the result of said comparison through the gate AC opened by the signal line l4 and through signal line l5, and the control unit CC performs the printing in the aforementioned manner in the absence of coincidence. Also the completion of printing of a line is identified by the line l12 of the gate AL indicating the output state of the line counter 7C.

The printing operation is continued thereafter in a similar manner.

In case the output line l1 of the flip-flop F1 is in the 0-level state indicating the absence of succeeding print instruction, the control unit returns the carriage CA to a position HO located at further right to the position HP through a procedure similar to that at the power turning on.

Such different stop position is selected at the termination of the printing operation since, in the course of continued printing operation, a closer stop position HP is preferable in order to minimize the carriage moving time outside the slit area thereby reducing the time required for entire printing. At the carriage return to position HO, the control unit CC maintains the signal line l2 at the 0-level for a determined period in a similar manner as in the turning on of the power supply to reset the flip-flop F1, to clear the digit counter PC, line counter 7C, separating circuit TB and backward counter BC through the gate AR, to activate the one-shot multivibrator OS and to shift the signal line lR to the 1-level thereby opening the gate ST and allowing the entry of output pulses from the clock pulse generator CPG to the counter SC when the signal $\overline{TP}$ is at the 1-level. In this state the backward counter BC is maintained out of function as the gate BG is closed through the inverter IR.

Then the control unit CC shifts the signal lines lF and lB respectively to the 0-level and 1-level to drive the carriage in the backward direction. The counter SC repeats the counting of clock pulses from the generator CPG and the resetting by the timing pulses TP during the backward displacement, and releases an output signal through the signal line lS after counting for a determined period upon arrival of the carriage at the position HO shown in FIG. 16. In response to the signal the control unit CC identifies that the carriage has arrived at said position HO and shifts the line lB to zero thereby terminating the coil drive and stopping the carriage at said position HO. Thereafter the line lR is shifted to 0-level to open the gate ST and to open the gate BG through the inverter IR. In the meantime the driver PFD is further activated by the signal line l8 to perform paper feeding of three lines.

The aforementioned home position HP corresponds to the stop position of the carriage CA after inertial displacement following the termination of coil drive upon completion of slit counting by the backward counter BC. DSP1, DSP2 and DSP3 shown in FIG. 15 are display devices for displaying figures for calculation, for example operand, operator and result of calculation. In case the apparatus shown in FIGS. 12 and 13 is utilized in a combined copier-calculator, the numeral keys in the keyboard are also used for selecting the copy number which will be displayed in one of the display devices. An original information processing unit GPU functions in the copying operation to supply the information stored in a last-in-first-out memory LF for image information to an OR gate OR and an AND gate SD in the reversed order thereby performing the recording operation with a delay of one line. Also in place of such real-time reversed-order recording for each dot line, it is also possible to store the information of one row in memory LF, to supply the information to a pattern recognition circuit PI and to activate the character generator CG according to the identified characters or numerals. In this manner a manuscript original can be recorded in a clear typefont printing. The characters not identifiable by the character recognition circuit or other images can be printed in the original form. If memory LF is structured as a last-in-first-out stack memory, the image formation can be achieved easily as the information can be simply obtained in the reversed order. COPY indicates a copy instruction key. Also it is possible to receive the facsimile signals by the printing apparatus of a calculator as in the present embodiment.

Figure 20:
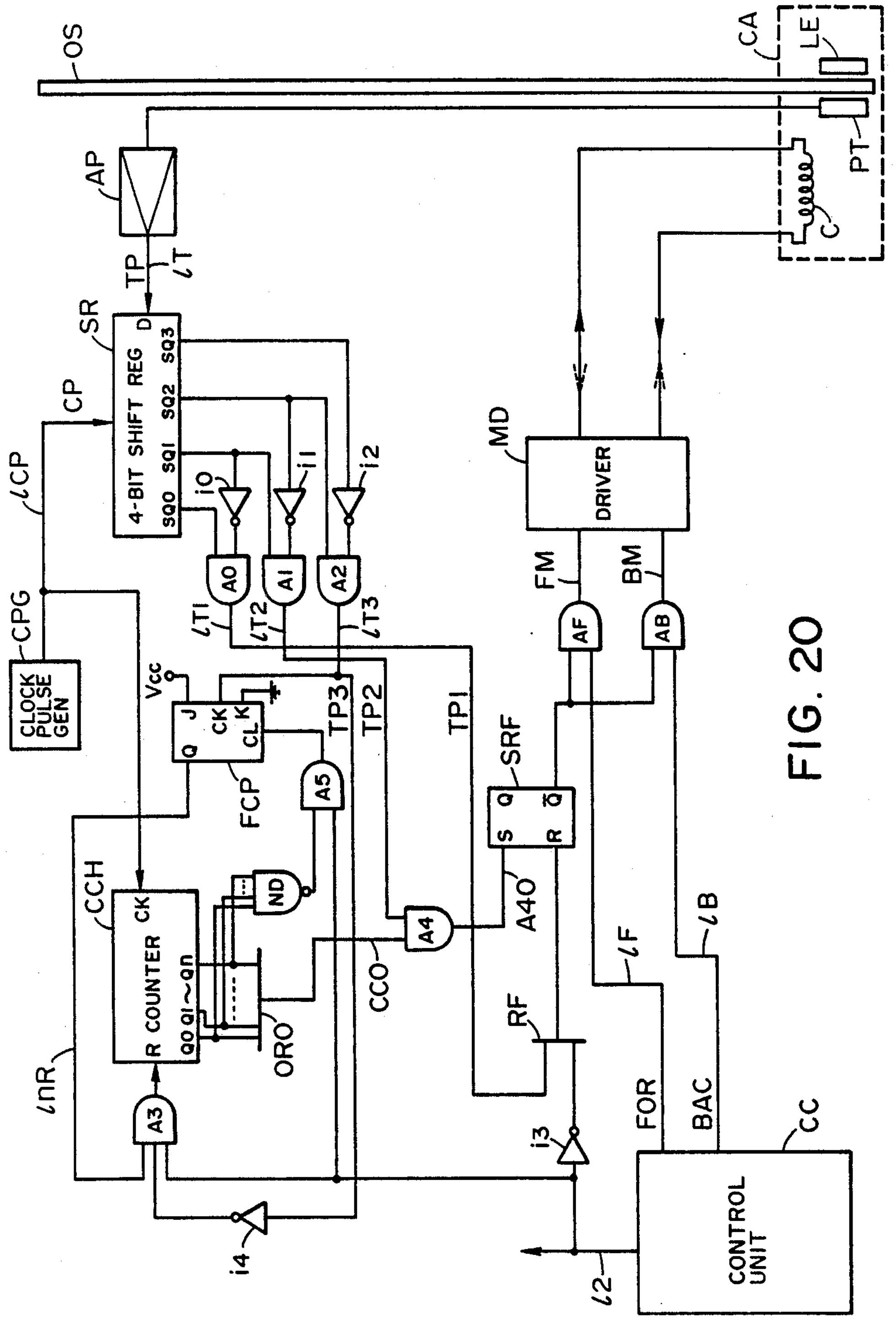
FIG. 20 is a block diagram showing an example of the speed control circuit.
Figure 21:
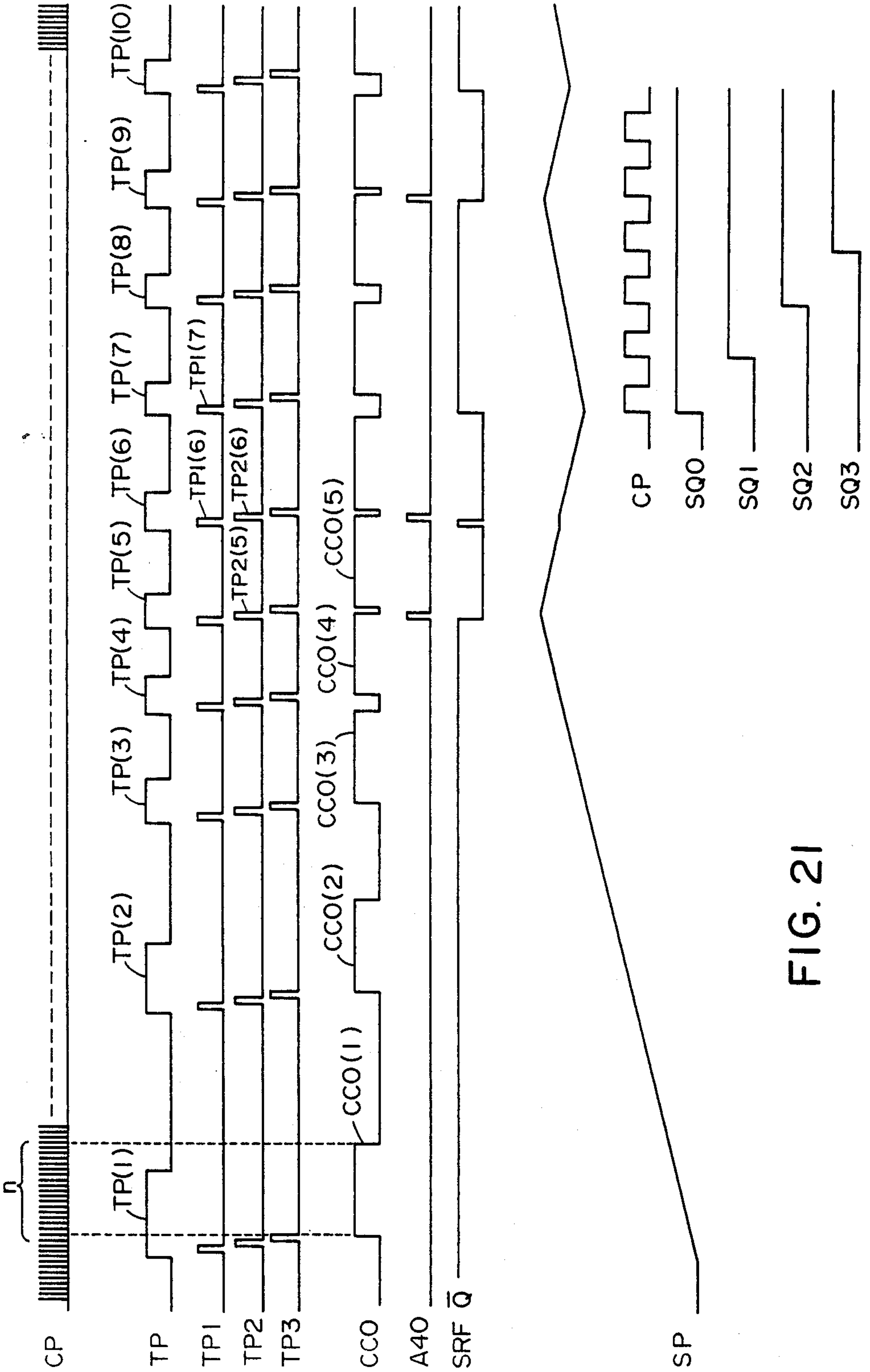
FIG. 21 is a waveform chart showing the function thereof.

A speed control circuit SC for the carriage CA shown in FIG. 15 is detailedly explained in the circuit diagram of FIG. 20 and the timing chart of FIG. 21. In FIG. 20 the detecting means LE, PT detect the slits on the optical slit plate OS during the displacement of the carriage CA and release timing pulses TP to the signal line lT through the amplifier AP in the aforementioned manner.

In response to timing pulse TP, the outputs SQ0, SQ1, SQ2 and SQ3 of a 4-bit shift register SR are set in succession by the clock pulses CP from the clock pulse generator CPG. An AND gate A0 releases an output signal TP1 through signal line lT1 indicating the logic product of the signal Q1 inverted by an inverter iO and the signal Q0, while an AND gate A1 releases an output signal TP2 through signal line lT2 indicating the logic product of the signal Q2 inverted by an inverter i1 and the signal Q1, and an AND gate A2 releases an output signal TP3 through signal line lT3 indicating the logic product of the signal Q3 inverted by an inverter i2 and the signal Q2, as shown in FIG. 21. Said signal TP1 through the line lT1 resets a flip-flop SRF through an OR gate RF while the signal TP2 supplied through the line lT2 opens an AND gate A4 during the period of said signal TP2.

Also the signal TP3 supplied through the line lT3 sets a flip-flop FCP and also is supplied to an AND gate A3 through an inverter i4 to reset a counter CCH during the 1-level state of the signal TP3 and to allow entry of the clock pulses CP to said counter CCH through a line lCP when the signal TP3 is shifted to 0-level.

The counter CCH is reset by the 0-level state of the signal line l2 at the start of the printing operation, and the flip-flop FCP is reset through an AND gate A5 and continues to reset the counter CCH by the 0-level state of the output line lnR. The counter CCH initiates the counting operation when the signal TP3 is shifted to 0-level to release the resetting after it has shifted to 1-level to set the flip-flop FCP thereby shifting the line lnR to 1-level. The counting operation is continued until all the outputs Q0–Qn are shifted to 1. Upon counting up to a number n, the NAND gate ND releases a 0-level signal to reset the flip-flop FCP and thus the counter CCH.

The flip-flop SRF is also reset by the signal line l2 through an inverter i3 and the OR gate RF, thereby opening AND gate AF and AB. Now the function will be further clarified in detail by FIG. 20.

In response to a timing pulse TP(1) there are generated pulse signals TP1, TP2 and TP3, whereby the flip-flop FCP is set, and the counter CCH initiates the counting of clock pulses CP and releases corresponding output signals to Q0–Qn. During the counting operation the output signal of an OR gate ORO is supplied through a line CCO to the AND gate A4.

Gate A4 also receives the TP2 which is to be generated in response to the timing pulse TP of which timing and width are related with the carriage speed. Consequently in case the carriage speed is low as represented by the timing pulse TP(1) shown in FIG. 21, the signal TP2 is not released during the counting operation of the counter CCH so that the flip-flop SRF remains in a reset state achieved by the preceding signal TP1 supplied through the gate RF. The drive of the coil C and the carriage CA is continued as the gates AF, AB are not affected.

In response to the timing pulses TP(2), TP(3) and TP(4) the gate A4 does not provide the logic product of the signal CCO and the signal TP2 in a similar manner, so that the coil drive is continued. As the result the displacing speed of the carriage CA is gradually increased, whereby the interval of timing pulses is progressively shortened. Thus, in response to the timing pulse TP(5), the gate A4 releases a logic product signal of the signal TP2(5) and the signal CCO(4) from the gate ORO to set the flip-flop SRF through a signal line A40.

In response to the setting the output signal $\overline{Q}$ is shifted from 1 to 0 to close the gates AF and AB thereby deactivating the driver MD and terminating the coil drive. Thereafter the carriage CA continues inertial displacement with a decreasing speed. The signal TP1(6) released in response to the succeeding timing pulse TP(6) resets the flip-flop SRF through the gate RF to open the gates AF, AB and restart the coil drive.

Between the signals TP2(5) and TP1(6) the carriage speed is reduced due to interrupted coil drive but still is considerably high at the succeeding timing pulse TP(6). Consequently the gate A4 releases again a logic product signal of the signals CCO(5) and TP2(6) to again set the flip-flop SRF thereby closing the gates AF and AB and interrupting the coil drive until the signal TP1(7) generated in response to the succeeding timing pulse TP(7).

Again in a similar manner the signal TP1(7) resets the flip-flop SRF through the gate RF to open the gates AF and AB and to restart the coil drive.

Thereafter the carriage speed control is continued in a similar manner by conducting the coil drive by the logic product signal of the signals TP2 and CCO, not interrupting the coil drive in response to the timing pulses TP(7) and TP(8) but interrupting the drive in response to the timing pulse TP(9). The above-explained control is realized both in the forward and backward directions since the output signal from the flip-flop SRF is supplied to two gates AF and AB.

Figure 22:
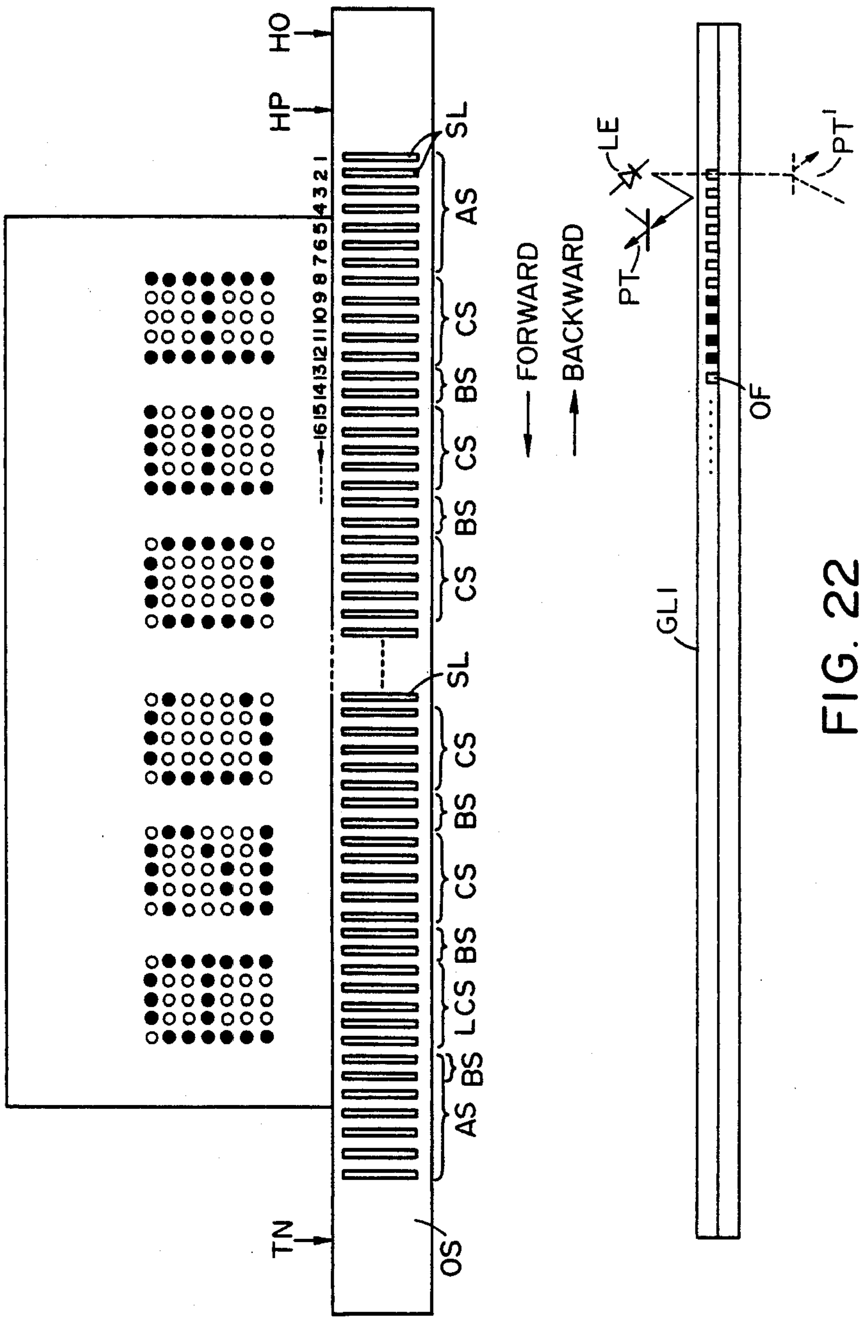
FIG. 22 is a magnified view of another embodiment of the graduation plate.

Now there will be given an explanation on a two-directional recording in a calculator mode utilizing a signal generating plate shown in FIG. 22 and a circuit shown in FIG. 23.

Figure 23:
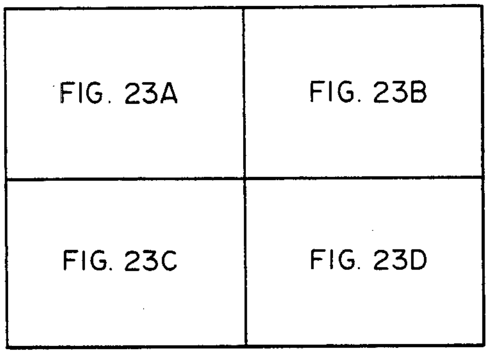
FIGS. 23A through 23D, when combined as shown in FIG. 23, are a chart showing the control block therefor.

Referring to FIG. 23, upon receipt of a print instruction the flip-flop F1 is set to provide a set signal through a signal line l1 and the control unit CC resets, through a signal line l2, the digit counter PC, line counter 7C, speed control circuit SC, flip-flop F1, timing pulse separating circuit TB and backward counter BC and shifts a signal line lTN to 0-level.

The coincidence circuit CO compares the content of a digit counter PC composed of an up-down counter of which content is increased or decreased by a signal line lUD and that of the digit register PR, and, in the absence of the coincidence identified through the gate AC opened by the signal line l4, the control unit shifts the signal lines lF and lB respectively to the 1-level and 0-level to displace the carriage CA in the forward direction by means of the driver MD. Along with the displacement of the carriage timing pulses TP are generated as explained in the foregoing and supplied to the timing pulse separating circuit TB through a gate GTP which is maintained open through the inverter i since the outputs of the line counter 7C are not all "1" in this state. Also the output signal supplied from the backward counter BC through a line lBC is not supplied to the control unit CC since a gate GBC is not opened until the outputs of the line counter all assume the high-level state.

The number of digits to be printed in a row is previously stored in the print digit register PR, and 5-bit output signals from the character generator CG obtained in response to the data selected from the character memory CM by the digit counter PC through the decoder DC and also in response to the output signal from the line counter 7C are supplied to the parallel-serial converter PSC. A character reversing circuit CRV required for backward printing operation is maintained constantly operational, but the data selection is controlled by gate groups GF and GB. The gates GF are opened by a signal line lF during the forward carriage displacement while the gates GB are opened by a signal line lB during the backward displacement to transmit the data through the character reversing circuit CRV to the parallel-serial converter PSC, whereby the print signals are released to a signal line l10 in synchronization with 5-bit timing pulses TD1–TDn supplied through a signal line l6. The character reversing circuit CRV is bypassed in case of forward printing. The output signals of parallel-serial converter PSC are supplied through an AND gate SD, which is to be opened only during the high-level state of the timing pulses supplied through the line l6, and through the line l10 to the pulse width setting circuit DS, whereby the pulses of a determined width are supplied to the driver PD thereby activating the laser LA to perform printing.

In this manner conducted is the printing of 5 dots constituting the first line in seven lines of the 5×7 dot matrix of the first digit in the first print row.

Upon completion of the 5-dot printing, the control unit CC identifies the completion through a signal line l11 and step advances the digit counter PC through a signal line l7, but the signal line l remains in the 0-level state since the printing of 7th line is not yet completed. Then, as explained in the foregoing, the coincidence circuit CO compares the contents of the digit register PR and digit counter PC and releases the absence of coincidence through the signal line l5, and the control units CC executes the character readout from the memory corresponding to the advanced content of the digit counter PC and the dot printing in synchronization with 5-bit pulses from the separating circuit TB.

The above-mentioned steps of step advancing of the digit counter PC, memory readout and data entry to the parallel-serial converter PSC can be sufficiently completed before the 5-bit pulses since the clock frequency of the circuit is selected sufficiently higher than the frequency of the timing pulses TP.

In this manner continued is the forward printing of 5 dots of the first line in each 5×7 dot matrix in the first print row.

When the coincidence circuit CO identifies the coincidence of the contents of the digit counter PC and digit register PR, the control unit CC shifts the signal line lTN to the 1-level to open an AND gate ATN, whereby a counter CTN receives and counts the clock pulses from the clock pulse generator CPG while the carriage CA is on an opaque portion of the slit plate OS and is reset when the carriage CA passes through a translucent slit SL to shift the signal $\overline{TP}$ to zero. The capacity of counter CTN is selected larger than the number of clock pulses to be received during an opaque area so that it releases an output signal only when the carriage is displaced to an area TN shown in FIG. 22. In this manner the carriage CA, after printing the last digit at the last character slits LCS shown in FIG. 22, passes through the approach slits AS and is displaced to position TN. In response to the output signal from counter CTN, the control unit CC shifts the signal line lTN to 0-level to close the input gate ATN to counter CTN. At the same time the signal line lF is shifted to 0-level to terminal the forward carriage displacement, and the signal l8 is activated to perform paper feeding by the driver PFD. Also the counter 7C is step advanced, and the separating circuit TB and backward counter BC are reset through the gate AR. If the output from the AND gate AL is not high-level, the signal line lUD is shifted to high-level to set the digit counter PC, composed of an up-down counter, to the downward counting. Also a gate APR is closed through an inverter IP, and the content "0" of the digit register PR is supplied to the coincidence circuit CO. Upon receipt of the signal indicating the absence of coincidence in this case through the line l5, the control unit CC shifts the line lB to the high-level state to displace the carriage in the backward direction by the driver MD. Timing pulses TP are obtained in a similar manner as in the forward displacement from the detecting means LE, PT and the optical slit plate OS having approach slits in a symmetrical arrangement, and the signals TDn–TD1 are supplied from the separating circuit TB to the parallel-serial converter PSC through the line l6 in the same positions as in the forward displacement. Also in the same manner as in the forward printing, the character generator CG is activated by the data from the character memory CM selected by the digit counter PC through the decoder DC and by the output of the step advanced line counter PC. The output signals from said character generator CG are supplied to said parallel-serial converter PSC through the character reversing circuit CRV and the gates GB opened by the signal line lB. The printing in the backward direction is achieved similarly as in the forward direction by the pulses of a determined width supplied from the pulse width setting circuit DS to the drive PD for activating the laser LA.

The positional detection and speed control in the backward displacement is conducted in the same manner as in the forward displacement.

After the printing of n-th digit in the second line, the control unit CC releases a high-level signal to the line l7 whereby the content of the digit counter PC is step decreased to "n−1". Thereafter the printing is continued in the aforementioned manner through the function of the coincidence circuit CO.

When the digit counter PC reaches zero, the coincidence circuit CO releases a coincidence signal whereby the control unit CC opens the gate ATN through the signal line lTN as in the forward printing. Upon receipt of the output signal from the counter CTN indicating that the carriage CA has moved out from the slit area SL and reached the home position HP, the control unit CC shifts the line lTN to 0-level thereby terminating the pulse supply to the counter CTN. Then the control unit CC shifts the line lB to 0-level to terminal the backward carriage displacement, performs paper feeding by driving the driver PFD through the line l8, step advances the counter 7C, resets the separating circuit TB and backward counter BC, shifts the line lUD to 1-level to set the digit counter PC to the upward counting, and opens the gate APR to supplying the content of the digit register PR to the coincidence circuit CO. Thereafter the printing operation is continued in a similar manner up to the 7th line of the $5 \times 7$ dot matrixes, and, after the paper feeding and step advancing of the counter 7C upon completion of the forward printing of the 7th line, the counter 7C releases a high-level output signal to the line l12 through the gate AL indicating the completion of the 7th line printing. In response thereto the control unit CC shifts the line lB to the high-level state to displace the carriage CA in the backward direction by the driver MD. During said backward displacement the gate GTP is closed by the inverter i so that the timing pulses TP generated by the carriage displacement are not supplied to the separating circuit TB, and the signals from the backward counter BC are supplied to the control unit CC through the gate GB. The carriage is returned in this state to either of the aforementioned positions HP and HO according to the state of the line l1 indicating the presence or absence of succeeding print instructions. Thereafter the paper feeding is conducted to terminate the printing operation.

In the foregoing embodiment the detection of positions TN and HP is achieved by the counter CTN indicating the presence or absence of slits SL on the slit plate OS, but such detection can also be achieved by the counting of approach slits AS remaining after the completion of printing.

The foregoing embodiment, explained in the case of two-directional printing by the carriage scanning of information from a calculator ALT, is evidently applicable also to a two-directional recording in a copier or a facsimile in response to the original information read by two-directional scanning of the carriage. In such application the image reconstruction from such two-directional information reading can be achieved for example by the use of a first-in-first-out memory EF in the forward direction and of a last-in-first-out memory LF in the backward direction.

Figure 24:
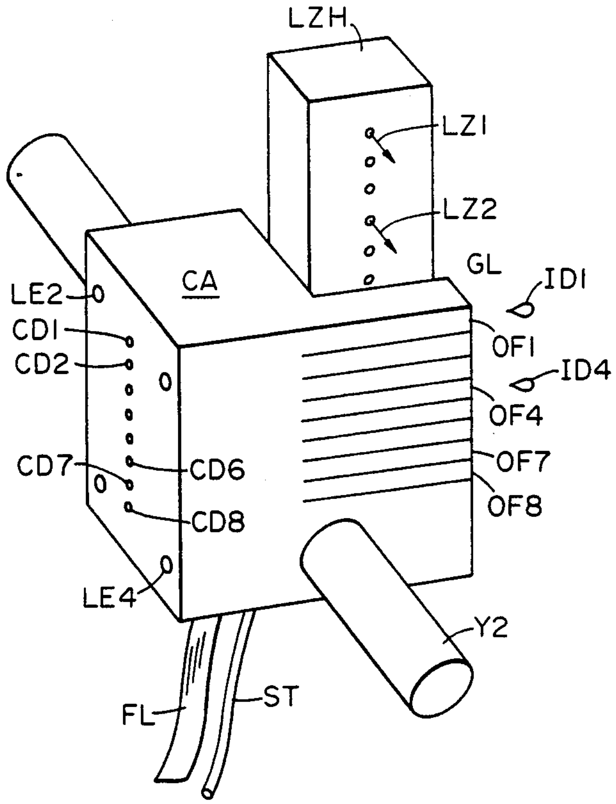
FIG. 24 is a view showing another embodiment of the recording head.
Figure 23A:
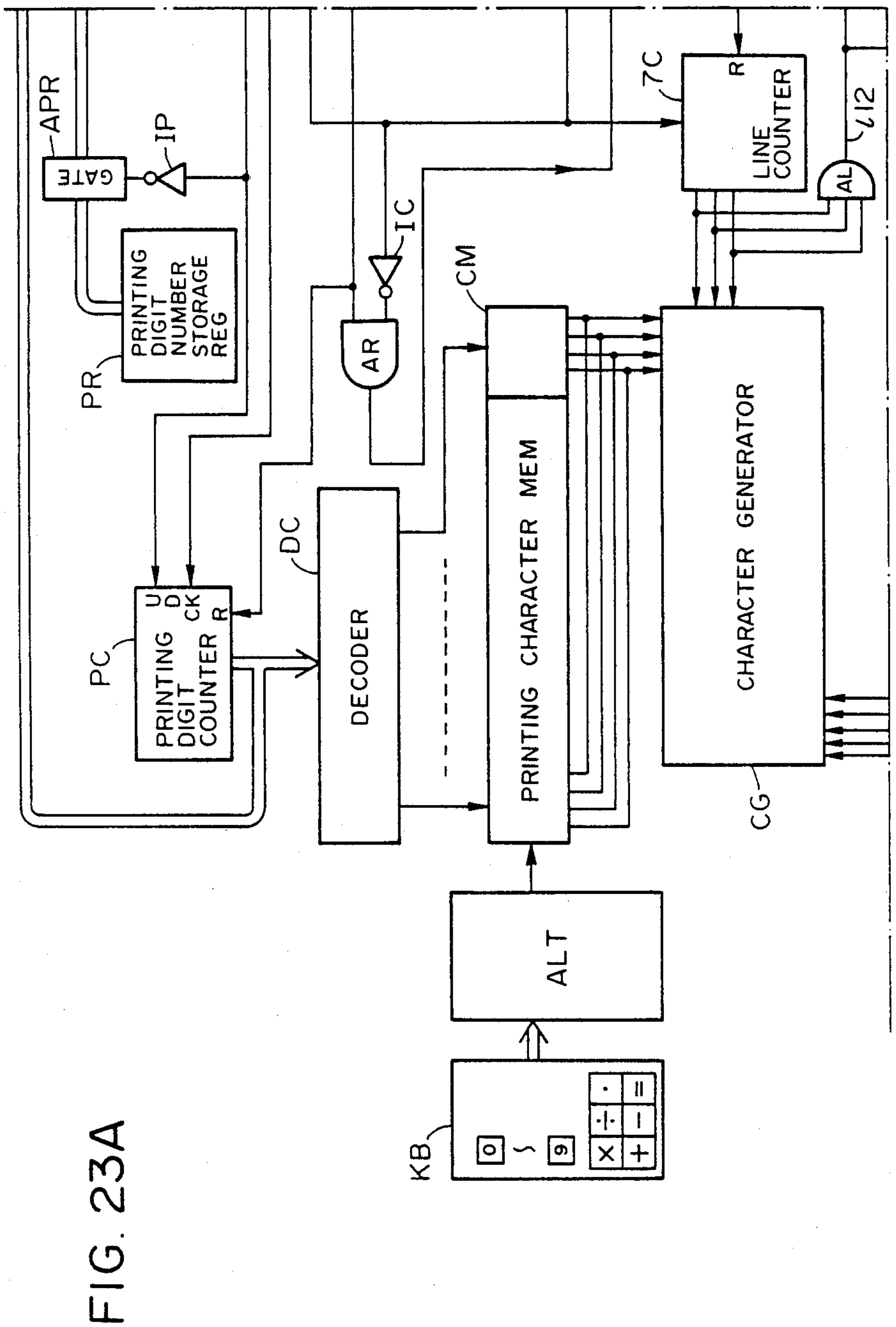
Figure 23B:
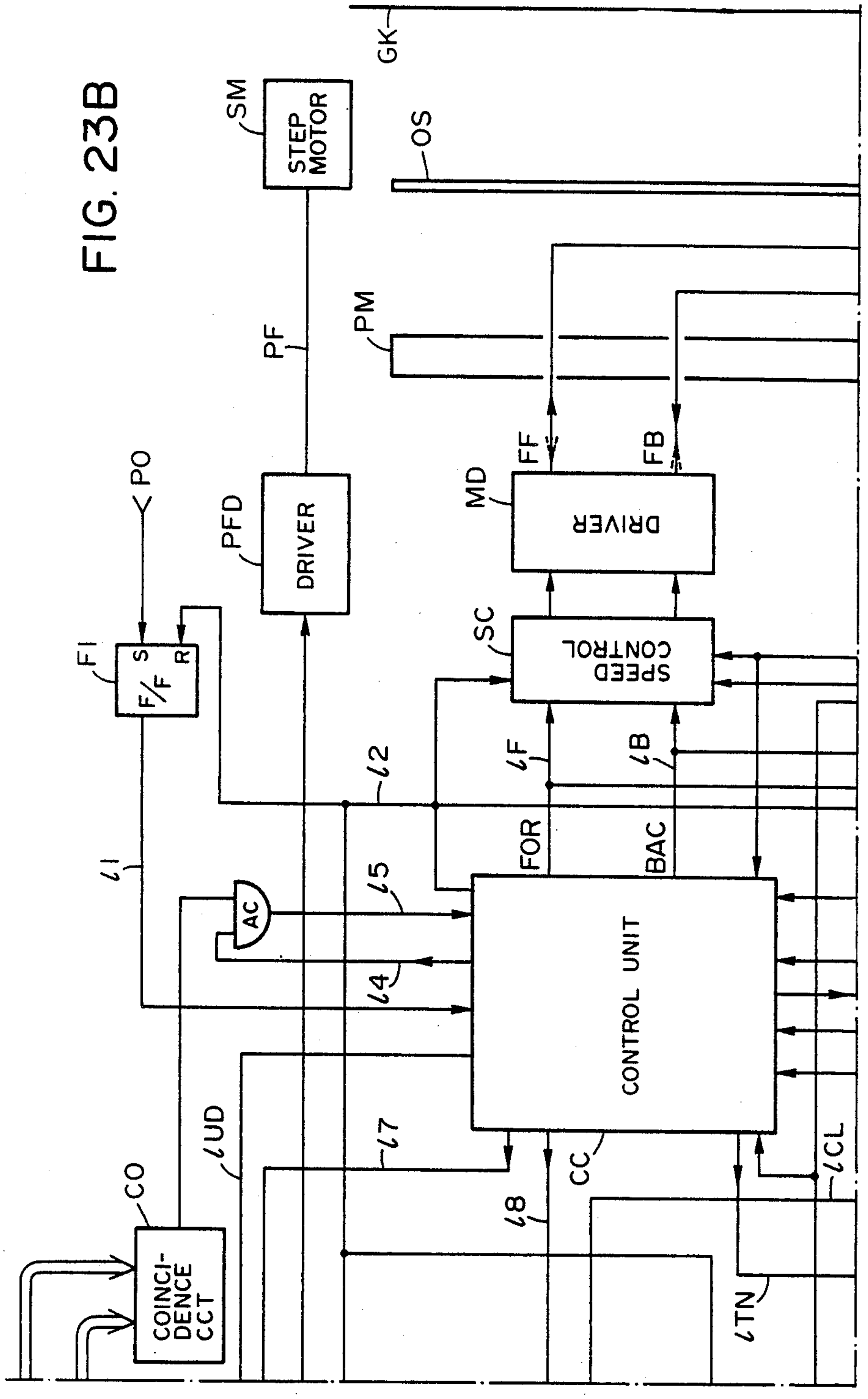
Figure 23C:
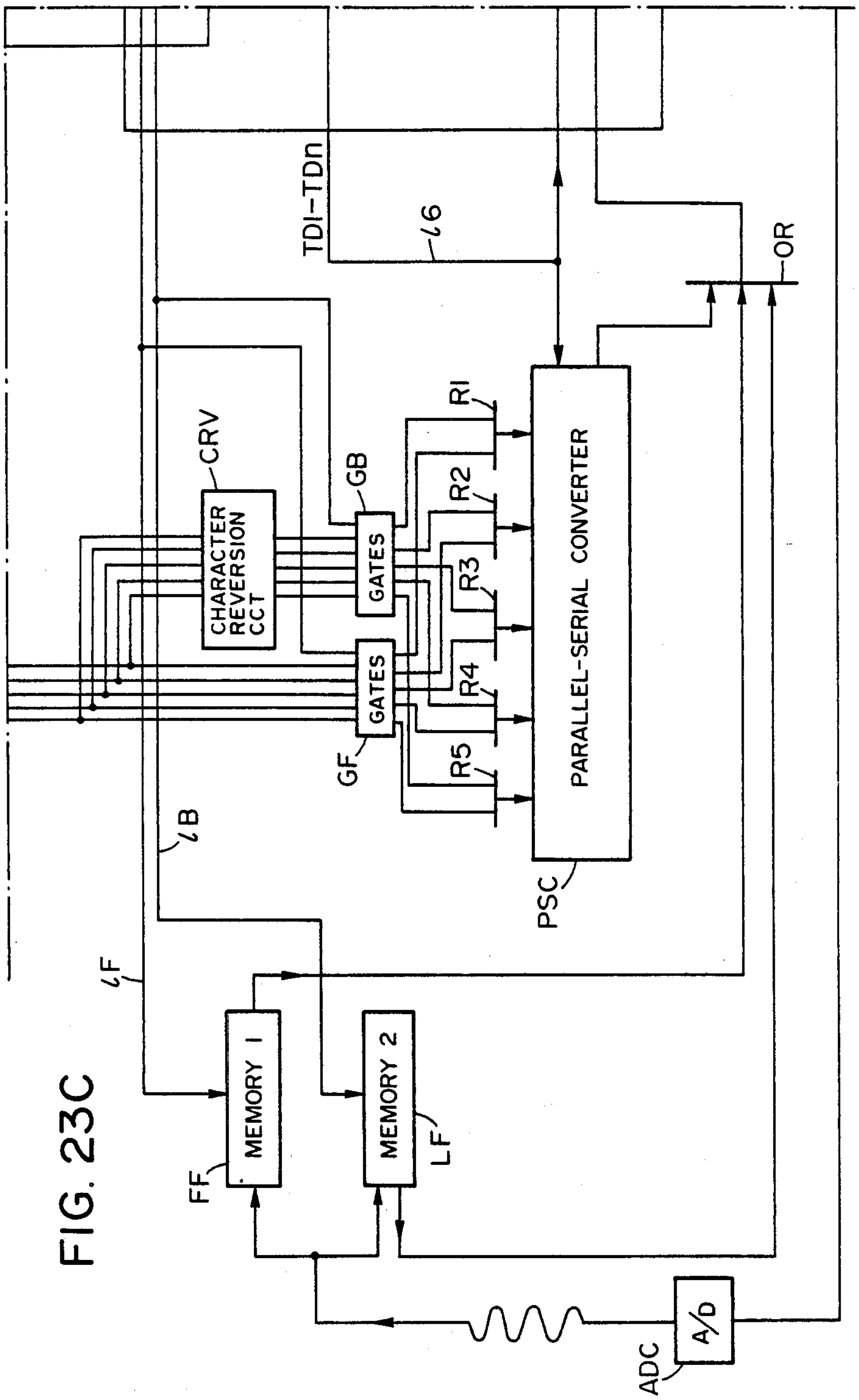
Figure 23D:
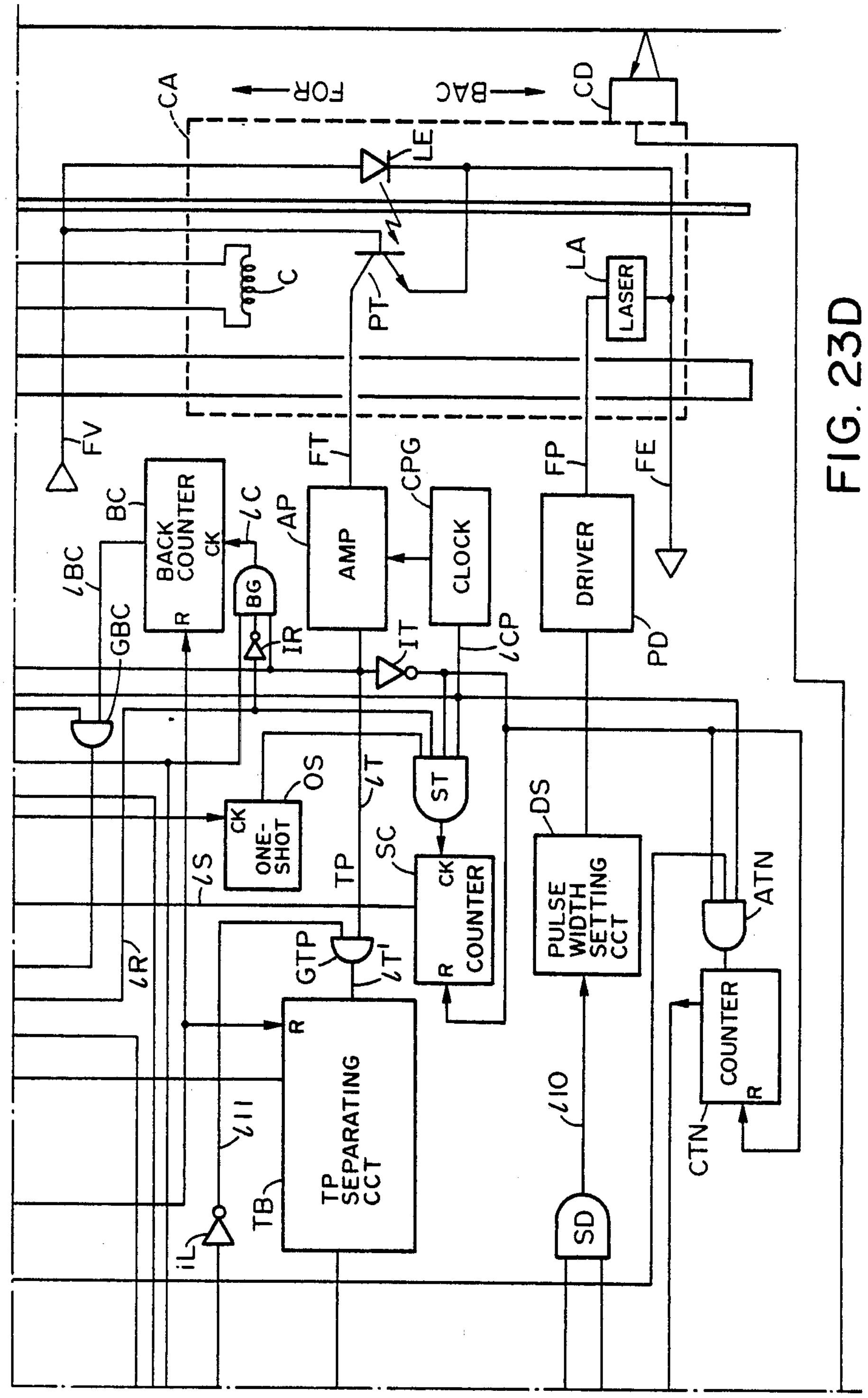

FIG. 24 shows another embodiment of the recording head of the present invention, wherein an ink jet head having orifices OF1–OF8 is integrally mounted on a carriage CA provided with photosensor elements CD1–CD8. Also light-emitting diodes LE1–LE4 for illuminating the original are provided in the vicinity of said photosensor elements.

Furthermore the carriage CA is integrally provided with thermal energy generating means such as the aforementioned laser head.

The present embodiment functions basically in the same manner as explained in the foregoing but by every 8 dot lines in contrast to every one dot line in the foregoing embodiments, thereby ensuring high-speed original reading and high-speed recording.

The present embodiment is similarly capable of storing the information of one row into the memory LF in a first carriage displacement and recording said information in the reversed order in the succeeding carriage displacement as explained in the foregoing, said function being conducted every 8 dot lines instead of every dot line in the foregoing embodiments.

There are provided 8 sets of lasers LA and drivers PD as shown in FIG. 24, so that the parallel-serial converter PSC is not necessarily essential.

In case the reading head and recording head are tegrally mounted on the carriage, the recording head maybe composed of a thermal head, piezo-driven ink jet head, thermal ink jet head or mechanical pin-matrix recording head. Also it is easily possible to obtain an overlaid recording the image information from an original and the numerical information from the calculator. For this purpose the driver PD can be selectively supplied with the output from the character generator CG and the output from the memories FF, LF.

It is furthermore possible to interrupt the recording operation during the reading operation of the carriage, or vice versa. Such reading or sensor means CD is also applicable to other single or combined reading operations for example of business forms, ID cards, etc. while the recording function is applicable to copying or multiple copying of such information.

Figure 25:
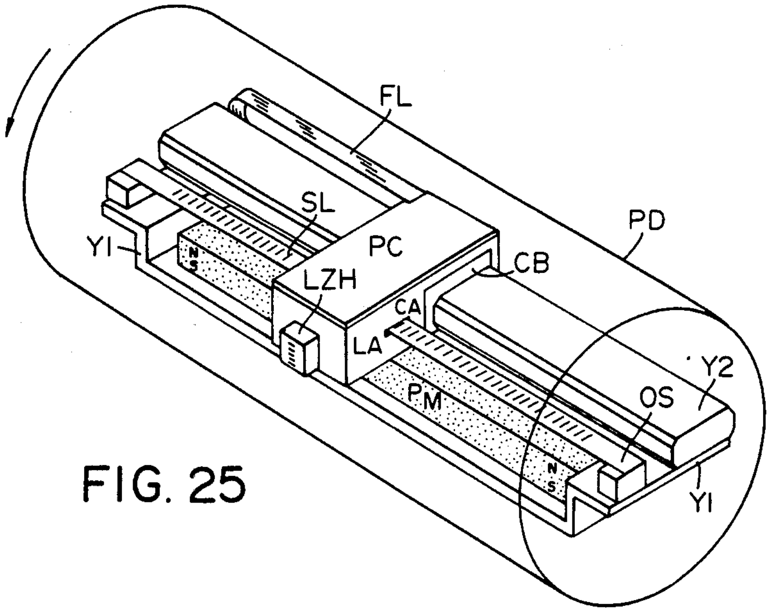
FIG. 25 is a view showing still another embodiment.
Figure 26:
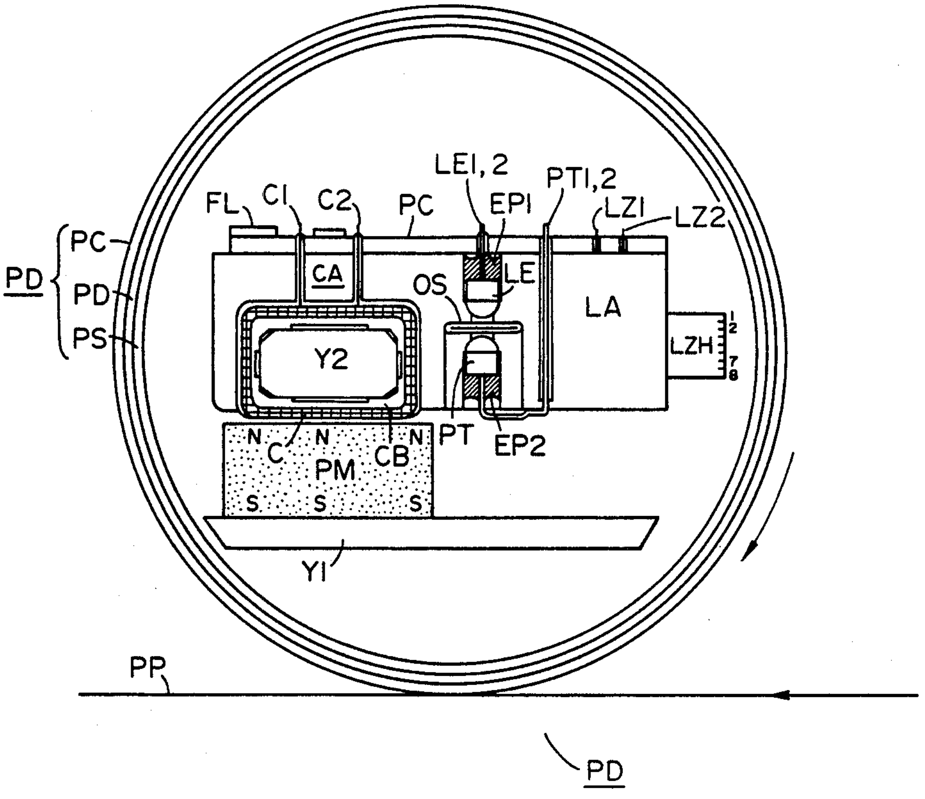
FIG. 26 is a cross-sectional view thereof.

FIGS. 25 and 26 show still another embodiment in which the recording head, for example an electromagnetic wave generating source LA and a linear motor mechanism for displacing the same are incorporated in a photosensitive drum PD constituting a primary recording medium. The photosensitive drum PD is composed for example of a translucent substrate PS, a translucent conductive layer PD and a photoconductive layer PC, on which an electrostatic image is formed for recording on a paper PP by an ordinary electrophotographic image transfer process.

The photosensitive drum PD may be formed in an arched shape for image recording through the translucent substrate, but is advantageously formed in a rotary shape.

Also such exposure through the translucent substrate PS is achieved not only with the semiconductor lasers but also with light-emitting diodes, etc., and a high-speed recording can be achieved for example by the use of 8 elements for simultaneous recording of 8 lines.

Figure 27:
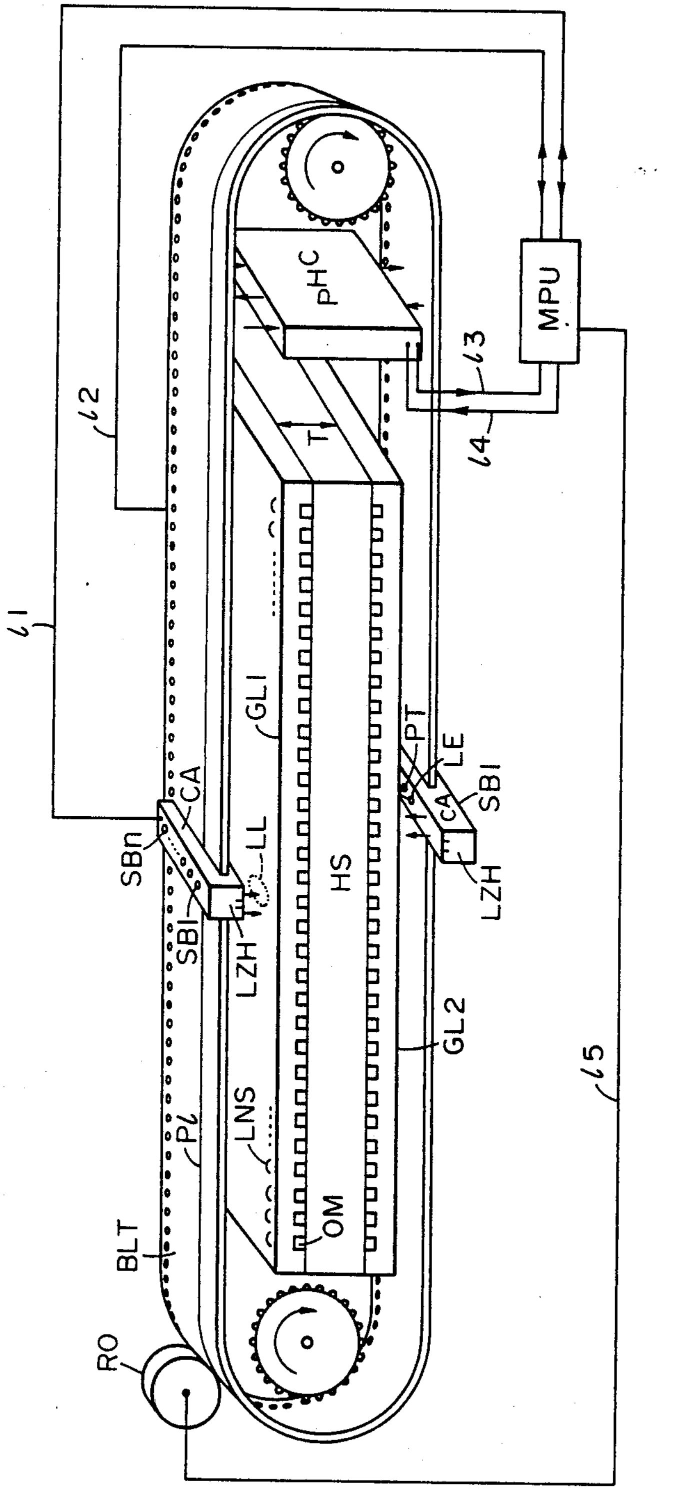
FIG. 27 is a view showing still another embodiment.

FIG. 27 shows still another embodiment in which the carriage CA is mounted on an endless belt BLT for high-speed recording. The signal transmission to or from the carriage CA may also be achieved through the photosensor elements LE, PT and photocouplers PHC mounted on the carriage CA instead of the ordinary flexible cable.

A part of the photosensor elements LE, PT is utilized for the detection of position and speed of the carriage CA by the detection of ink grooves OM provided in the grooved plates GL1 and GL2. Those plates are preferably provided integral lens LNS for focusing the beams from the semiconductor laser head. Also preferred is the use of a semiconductor laser head emitting oval beam LL in such a manner that the longer axis thereof becomes parallel to the direction of the ink grooves OM.

The electric power supply to the carriage CA may also be achieved through the conductors PL of the flexible cable and the roller RO.

Furthermore the original reading photosensor elements CD may be advantageously replaced by photovoltaic elements such as solar cells SB1–SBn for direct drive of the laser head LZH. Also the laser head LZH may be provided with plural lasers as shown in FIG. 24 for simultaneous emission of plural droplets. In such case the belt BLT may be driven in intermittent manner.

There may be formed a blank area on the recording paper in case the substrate HS is relatively thick, but such blank area can be filled up later, and such recording method is easily achieved by the use of memories and microprocessors already known in the art.

What we claim is:

1. Recording apparatus, comprising:

a recording unit having a plurality of dot forming means disposed in a plane, each of said dot forming means having an axis in the plane;

a carriage movable incrementally in a direction normal to the plane of dot forming means; and a laser generating means mounted on said carriage and having a semiconductor for selectively irradiating any of said dot forming means with a laser pulse emitted in a direction substantially perpendicular to the respective axis of each said dot forming means.

2. Recording apparatus according to claim 1, further comprising a linear motor for incrementally displacing said carriage.

3. Recording apparatus according to claim 1, wherein said recording unit includes a plurality of liquid chambers.

4. Recording apparatus according to claim 1, wherein said recording unit includes a photosensitive member.

5. Recording apparatus for recording on recording paper, comprising:

a recording unit having a plurality of liquid chambers disposed in a line normal to a feed direction of the recording paper;

a carriage positioned in the vicinity of the plurality of liquid chambers and movable parallel to the line of liquid chambers to select one of the plurality of liquid chambers of said recording unit; and laser generating means mounted on said carriage for generating a laser pulse in a direction substantially perpendicular to the line of liquid chambers to selectively irradiate any of the plurality of liquid chambers.

6. Recording apparatus according to claim 5, wherein said laser generating means is a semiconductor laser generating means.

7. Recording apparatus according to claim 5, wherein a liquid droplet is formed through generation and condensation of a single vapor bubble in one of said plurality of liquid chambers.

8. Recording apparatus, comprising:

means for supplying ink;

a recording unit including a plurality of dot forming means each connected to said supplying means for receiving ink therefrom, said dot forming means being arranged side by side in a line for emitting ink received from said supplying means, said dot forming means being arranged to emit the ink in a direction normal to the line of said dot forming means;

a carriage incrementally displaceable substantially parallel to the direction of the line and normal to the ink emitting direction; and a laser generating means mounted on said carriage and including a semiconductor for selectively irradiating any of said dot forming means with a laser pulse emitted in a direction substantially perpendicular to each dot forming means.

9. Recording apparatus according to claim 8, wherein each said dot forming means of said recording unit includes a liquid chamber.

10. Recording apparatus according to claim 8, wherein said recording unit includes a photosensitive member.

11. Recording apparatus according to claim 8, further comprising a linear motor for incrementally displacing said carriage.

12. Recording apparatus, comprising:

a recording unit including a drum having a surface, and a plurality of dot forming means arranged side by side in a line that is substantially parallel to said surface of said drum, each of said dot forming means including a portion having an axis normal to the line and being operable to form a dot on said surface;

a carriage incrementally displaceable in a direction substantially parallel to the line of said dot forming means; and a laser generating means mounted on said carriage and including a semiconductor for selectively irradiating any of said dot forming means with a laser pulse emitted in a direction substantially perpendicular to the respective axis of each dot forming means.

13. Recording apparatus according to claim 12, wherein said drum comprises a translucent material, and wherein said carriage is disposed in said drum.

* * * * *